US010648540B2

(12) United States Patent
Mordukhovich et al.

(10) Patent No.: US 10,648,540 B2
(45) Date of Patent: May 12, 2020

(54) CONTROL METHOD FOR DUAL-CLUTCH TRANSMISSION WITH MULTIPLE FIRST GEARS

(71) Applicant: AVL Powertrain Engineering, Inc., Plymouth, MI (US)

(72) Inventors: Gregory Mordukhovich, Bloomfield Hills, MI (US); Michael Kozan, Canton, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 209 days.

(21) Appl. No.: 15/850,796

(22) Filed: Dec. 21, 2017

(65) Prior Publication Data

US 2018/0112741 A1    Apr. 26, 2018

Related U.S. Application Data

(63) Continuation of application No. 14/941,488, filed on Nov. 13, 2015, now Pat. No. 9,897,165.
(Continued)

(51) Int. Cl.
*F16H 3/00* (2006.01)
*F16H 3/097* (2006.01)
(Continued)

(52) U.S. Cl.
CPC ............ *F16H 3/006* (2013.01); *F16H 3/097* (2013.01); *F16H 37/046* (2013.01); *F16H 2003/0931* (2013.01); *F16H 2200/0056* (2013.01)

(58) Field of Classification Search
CPC ..... F16H 3/006; F16H 3/04; F16H 2003/0815
See application file for complete search history.

(56) References Cited

U.S. PATENT DOCUMENTS 2,972,899 A    2/1961  Wiggermann
3,426,607 A  * 2/1969  Ilie ............................ F16H 3/04
                                                        74/330
(Continued)

FOREIGN PATENT DOCUMENTS

GB          2112883 A       7/1983

OTHER PUBLICATIONS

Hellenbroich, Gereon et al.; "Innovative xDCT Family of FEV—Extremely Compact 7 and 10 Speed DCTs;" SAE International Symposium on International Automotive Technology 2013, SAE Technical Paper 2013-26-0120, Jan. 9-12, 2013, SIAT, India; pp. 1-5.
(Continued)

*Primary Examiner* — Sherry L Estremsky
(74) *Attorney, Agent, or Firm* — Harness, Dickey & Pierce, P.L.C.

(57) ABSTRACT

A dual-clutch transmission assembly and method for controlling the same is provided where the torque generated by an engine is split between first and second shafts. Torque is supplied to the first shaft by a first clutch and torque is supplied to the second shaft by a second clutch. A first gearset is carried on the first shaft and a second gearset is carried on the second shaft. The first gearset includes a primary first gear and the second gearset includes a duplicate first gear. The first and second shafts receive torque from a transmission input shaft in response to contemporaneous engagement of the primary first gear, the duplicate first gear, and the first and second clutches, which can be used during vehicle launch to split the torque applied to the first and second clutches.

8 Claims, 10 Drawing Sheets

Related U.S. Application Data

(60) Provisional application No. 62/121,756, filed on Feb. 27, 2015, provisional application No. 62/082,696, filed on Nov. 21, 2014.

(51) Int. Cl.
*F16H 37/04* (2006.01)
*F16H 3/093* (2006.01)

(56) References Cited

U.S. PATENT DOCUMENTS

| | | |
|---|---|---|
| 4,513,631 A | 4/1985 | Koivunen |
| 4,640,145 A | 2/1987 | Vandervoort |
| 4,658,663 A | 4/1987 | Hiraiwa |
| 5,150,628 A | 9/1992 | Alfredsson |
| 5,172,602 A | 12/1992 | Jurgens et al. |
| 5,347,879 A | 9/1994 | Ordo |
| 6,427,549 B1 | 8/2002 | Bowen |
| 6,634,247 B2 | 10/2003 | Pels et al. |
| 6,755,089 B2 | 6/2004 | Hirt |
| 6,958,028 B2 | 10/2005 | Janson et al. |
| 7,587,957 B2 | 9/2009 | Jackson |
| 7,913,581 B2 | 3/2011 | Jackson |
| 8,051,732 B2 | 11/2011 | Gitt |
| 8,116,951 B2 * | 2/2012 | Holmes .............. B60K 6/36 475/208 |
| 9,897,165 B2 | 2/2018 | Mordukhovich et al. |
| 2004/0025612 A1 | 2/2004 | Ahnert et al. |
| 2006/0142104 A1 | 6/2006 | Sailer |
| 2014/0150584 A1 | 6/2014 | Terashima |
| 2016/0146320 A1 | 5/2016 | Mordukhovich |
| 2016/0146321 A1 | 5/2016 | Mordukhovich et al. |

OTHER PUBLICATIONS

Hellenbroich, Gereon et al.; "FEV's new parallel hybrid transmission with single dry clutch and electric torque support," VDI-Berichte 2017, Internationaler VDI-Kongress, Getriebe in Fahrzeugen Jun. 30, 2009, and Jul. 1, 2009; http://www.fev.com/fileadmin/usuer_upload/Media/TechnicalPublications/Transmission/IV_4_FEV's_new_parallel_hybrid_transmission_with_single_dry_clutch_and_electric_torque_support. pdf; 11 pages.

* cited by examiner

CONTROL METHOD FOR DUAL-CLUTCH TRANSMISSION WITH MULTIPLE FIRST GEARS

CROSS-REFERENCE TO RELATED APPLICATIONS

This application is a continuation of U.S. application Ser. No. 14/941,488, filed on Nov. 13, 2015, which claims the benefit of U.S. Provisional Application No. 62/082,696, filed on Nov. 21, 2014, and U.S. Provisional Application No. 62/121,756, filed on Feb. 27, 2015. This application is also related to U.S. application Ser. No. 14/941,484, filed on Nov. 13, 2015. The entire disclosures of the applications referenced above are incorporated herein by reference.

FIELD

The present disclosure generally relates to the field of dual-clutch transmissions (DCT). More specifically, a dual-clutch transmission assembly and control method are disclosed where torque generated by an engine of a vehicle is split into multiple torque flow paths using multiple first gears.

BACKGROUND

This section provides background information related to the present disclosure which is not necessarily prior art.

Conventional dual-clutch transmissions (DCT) combine two manual transmissions into a single transmission assembly. Accordingly, dual-clutch transmissions provide a design alternative to conventional manual and automatic transmissions and can offer increased efficiency when properly configured for a particular vehicle. With increasing fuel costs, vehicle fuel economy has become an important design consideration in recent years contributing to a rise in the number of dual-clutch transmissions being installed in vehicles, particularly in the automotive market.

Dual-clutch transmissions typically include two layshafts, each supporting a plurality of gears. Each layshaft also has a clutch interconnecting the layshaft to a hub and each clutch connects and disconnects each respective layshaft from the engine. One of the layshafts may include only odd numbered gears while the other layshaft may include only even numbered gears so that clutch-to-clutch power-on shifts can be accomplished in a similar manner to the shifting of a planetary automatic transmission. Accordingly, one of the layshafts may carry a first gear while the other layshaft carries a second gear and so on. The number of forward gear ratios provided thus equals a sum of the number of gears disposed along the two layshafts. Additional gear ratios thus require the addition of odd and even numbered gears to the layshafts, which contributes to a larger, heavier, costlier, and less efficient dual-clutch transmission.

During vehicle launch, conventional dual-clutch transmissions engage the first gear and the clutch that is connected to the layshaft supporting the odd numbered gears. Accordingly, all of the torque from the engine is directed through this one clutch. To reduce the noise, vibration, and harshness of the vehicle launch, some slip of this clutch is permitted until a minimum required vehicle speed is achieved and clutch lock-up torque disturbance is within pre-designated limits. This clutch slip, particularly for extended durations of time, requires an effective cooling strategy for the clutch. Where the clutch is a wet clutch, cooling is achieved by high volume fluid flow through the clutch, which may reach up to 20 liters per minute. Such coolant flow requirements lead to an increase in pump size and/or number, which increases parasitic losses and thereby decreases the efficiency of the dual-clutch transmission. Accordingly, dry clutches are typically more efficient since pump related losses can be reduced or eliminated. However, such dry clutches rely on less efficient air-cooling and repeated launches can lead to overheating of the clutch. Limiting slip time or alternating first gear launches with second gear launches (thus utilizing the clutch for the even numbered gears while the clutch for the odd numbered gears cools) has been used as a strategy to avoid structural damage to the clutch and/or transmission, but there are several drawbacks associated with these strategies. Mainly, torque jerks, slower acceleration, and increased noise, vibration, and harshness occur.

SUMMARY

This section provides a general summary of the disclosure, and is not a comprehensive disclosure of its full scope or all of its features.

In accordance with one aspect of the subject disclosure, a dual-clutch transmission assembly is provided that splits the torque generated by the engine of a vehicle between first and second shafts. The dual-clutch transmission assembly includes at least one transmission input shaft, a first input member that is rotatably coupled to the at least one transmission input shaft, and a second input member that is disposed co-axially within the first input member. The first shaft of the dual-clutch transmission assembly is hollow and is aligned with the first input member. The second shaft of the dual-clutch transmission assembly is disposed co-axially within the first shaft. A first clutch is disposed between the first input member and the first shaft. Accordingly, the first clutch selectively couples the first input member and the first shaft such that the first shaft rotates with the first input member. A second clutch is disposed between the second input member and the second shaft. Accordingly, the second clutch selectively couples the second input member and the second shaft such that the second shaft rotates with the second input member.

The dual-clutch transmission assembly may further include a third shaft and a planetary gearset that is disposed between and interconnects the first and third shafts. The third shaft is hollow and extends co-axially about the second shaft at a location that is axially spaced from the first shaft. The first gearset is rotatably coupled to and carried on the third shaft and the second gearset is rotatably coupled to and carried on the second shaft. The dual-clutch transmission assembly may also include an output member and an output gearset. The output member extends co-axially about the first and second gearsets and is rotatably coupled to the transmission output shaft. The output gearset is rotatably coupled to and carried on the output member and is arranged in meshing engagement with the first and second gearsets. In operation, each of the second and third shafts receives torque in response to contemporaneous engagement of the primary first gear, the duplicate first gear, the first clutch, and the second clutch. Advantageously, the first and second clutches can be engaged contemporaneously during launch of the vehicle to split the torque applied to the first and second clutches and to reduce heat generation in the first clutch and in the second clutch.

In accordance with another aspect of the subject disclosure, a method for controlling the dual-clutch transmission assembly is provided. The method includes the steps of providing torque to both the first clutch and the second clutch and contemporaneously engaging the first and second clutches, the primary first gear, and the duplicate first gear during a vehicle launch to split the torque transmitted through the first and second clutches evenly between first and second torque flow paths. The first torque flow path passes through the first clutch, the first shaft, and the primary first gear and the second torque flow path passes through the second clutch, the second shaft, and the duplicate first gear. The method also includes transferring the torque from both the first and second torque flow paths to a final drive assembly of the vehicle.

The dual-clutch transmission assembly and control method disclosed herein reduce heat generation in the first and second clutches. As a result, a more efficient, more durable, and better performing transmission is realized. Where the first and second clutches are wet clutches, the coolant flow requirements of the clutches are reduced leading to reduced pumping losses and increased efficiency. Where the first and second clutches are dry clutches, less heat generation results in fewer clutch failures, the possibility of longer slip times, and first gear launches can be utilized exclusively (as opposed to alternating between first and second gear launches) for improved acceleration and reduced noise, vibration, and harshness. In addition, the clutch size and clutch cooling provisions can be reduced.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
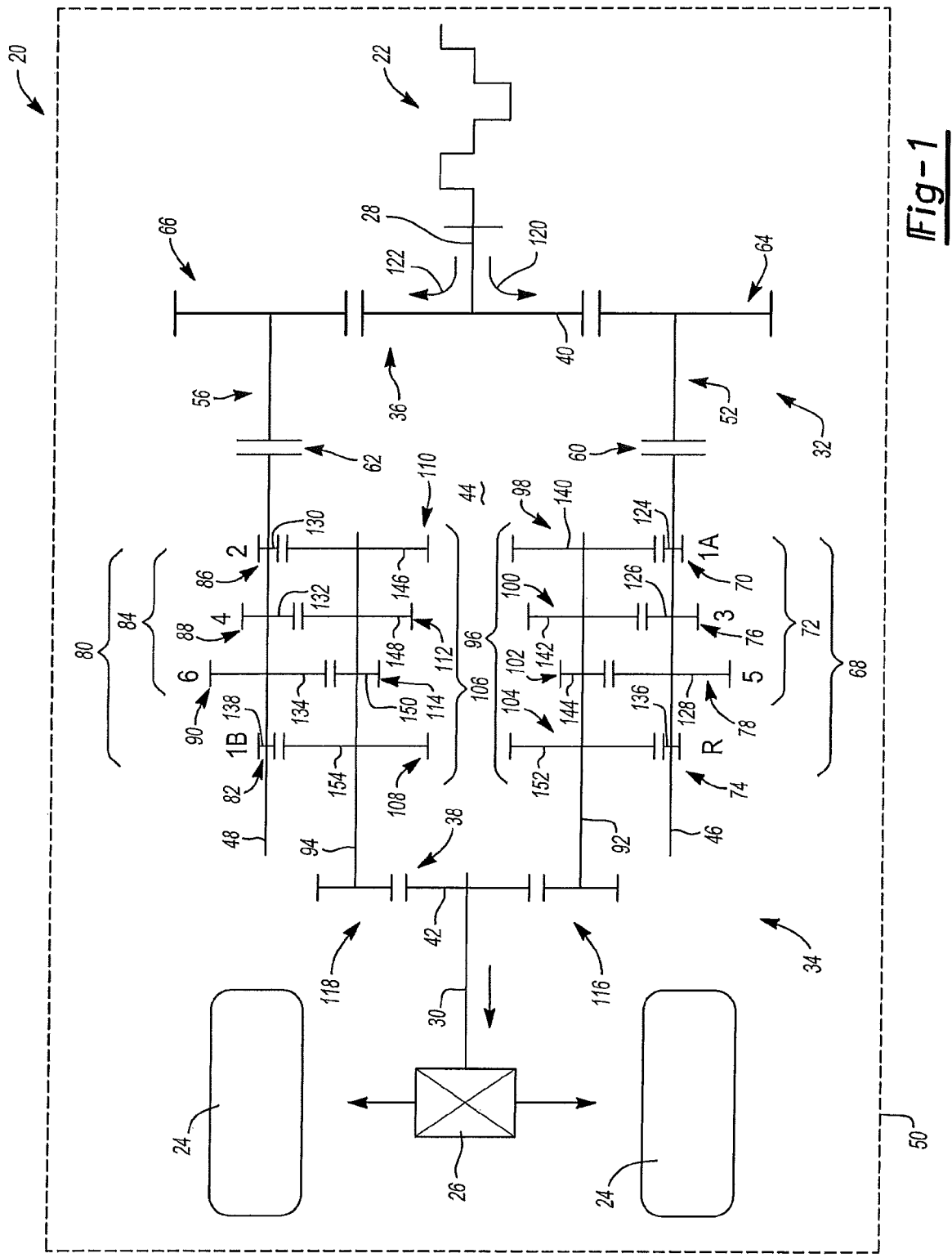
FIG. 1 is a schematic view of an exemplary dual-clutch transmission assembly constructed in accordance with the subject disclosure where third and fourth gearsets are arranged on first and second intermediate shafts respectively.

Referring to the Figures, wherein like numerals indicate corresponding parts throughout the several views, a dual-clutch transmission assembly 20 is disclosed. It should be appreciated that in operation, the dual-clutch transmission assembly 20 splits the torque generated by an engine 22 of a vehicle and applies the torque to the wheels 24 of a vehicle through one or more drivetrain components 26.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, the dual-clutch transmission assembly 20 includes a transmission input shaft 28 that receives torque from the engine 22 of the vehicle. The dual-clutch transmission assembly 20 also includes a transmission output shaft 30 that supplies torque to the wheels 24 of the vehicle through drivetrain components 26 such as the final drive assembly 26. Accordingly, the dual-clutch transmission assembly 20 receives torque through the transmission input shaft 28, which may generally be positioned at one end 32 of the dual-clutch transmission assembly 20 and outputs torque through the transmission output shaft 30, which may generally be positioned at an opposite end 34 of the dual-clutch transmission assembly 20. The dual-clutch transmission assembly 20 may thus be installed in a vehicle between the engine 22 of the vehicle and the various drivetrain components 26, which may include without limitation, a final drive assembly. It should be appreciated that such drivetrain components 26 ultimately couple the transmission output shaft 30 to one or more wheels 24 of the vehicle such that the wheels 24 of the vehicle are rotatably driven by rotation of the transmission output shaft 30.

As shown in FIG. 1, a transmission input gear 36 is rotatably coupled and carried on the transmission input shaft 28 and a transmission output gear 38 is rotatably coupled to and carried on the transmission output shaft 30. By way of example and without limitation, the transmission input gear 36 may be fixed to the transmission input shaft 28 by a splined, bolted, or welded connection or may be integral with the transmission input shaft 28 and the transmission output gear 38 may be fixed to the transmission output shaft 30 by a splined, bolted, or a welded connection or may be integral with the transmission output shaft 30. The transmission input gear 36 has a transmission input gear diameter 40 and the transmission output gear 38 has a transmission output gear diameter 42. The transmission input shaft 28 and the transmission output shaft 30 may generally be aligned with one another and spaced from one another by a longitudinally extending gap 44. The dual-clutch transmission assembly further includes a first layshaft 46 and a second layshaft 48. In FIG. 1, the first layshaft 46 extends parallel to and is transversely spaced from the transmission input shaft 28 and the second layshaft 48 extends parallel to and is transversely spaced from the transmission input shaft 28 and the first layshaft 46. Thus, the first and second layshafts 46, 48 are parallel with one another. The first and second layshafts 46, 48 may generally be parallel to and transversely spaced from the longitudinally extending gap 44 and may extend across the longitudinally extending gap 44. The first and second layshafts 46, 48 may also be arranged in a common plane 50 along with the transmission input and output shafts 28, 30 for a more compact arrangement of the dual-clutch transmission assembly 20. However, it should be appreciated that other arrangements are possible and are within the scope of the subject disclosure.

The first layshaft 46 is generally aligned with a first input hub 52 that is disposed adjacent the transmission input shaft 28. Similarly, the second layshaft 48 is aligned with a second input hub 56 that is also disposed adjacent the transmission input shaft 28. A first clutch 60 is disposed between and interconnects the first input hub 52 and the first layshaft 46. A second clutch 62 is disposed between and interconnects the second input hub 56 and the second layshaft 48. When the first and second clutches 60, 62 are engaged during operation of the dual-clutch transmission assembly 20, the first clutch 60 selectively couples rotation of the first input hub 52 with rotation of the first layshaft 46 and the second clutch 62 selectively couples rotation of the second input hub 56 with rotation of the second layshaft 48. It should further be appreciated that the first and second clutches 60, 62 may be, without limitation, wet clutches or dry clutches and may be constructed of various known components including, without limitation, clutch plates, actuators, and friction surfaces.

A first layshaft input gear 64 is rotatably coupled to and carried on the first input hub 52 and is arranged in meshing engagement with the transmission input gear 36. Accordingly, the first layshaft input gear 64 transfers rotational energy and torque from the transmission input gear 36 to the first input hub 52 during operation of the of the dual-clutch transmission assembly 20. Similarly, a second layshaft input gear 66 is rotatably coupled to and carried on the second input hub 56 and is arranged in meshing engagement with the transmission input gear 36 opposite the first layshaft input gear 64. Accordingly, the second layshaft input gear 66 transfers rotational energy and torque from the transmission input gear 36 to the second input hub 56 during operation of the dual-clutch transmission assembly 20. By way of non-limiting example, the first layshaft input gear 64 may be fixed to the first input hub 52 by a splined, bolted, or welded connection or may be integral with the first input hub 52 and the second layshaft input gear 66 may be fixed to the second input hub 56 by a splined, bolted, or welded connection or may be integral with the second input hub 56.

A first gearset 68 is rotatably coupled to and carried on the first layshaft 46. As shown in FIG. 1, the first gearset 68 includes a primary first gear 70, a plurality of odd numbered gears 72, and a reverse gear 74. Although any number of odd numbered gears 72 and reverse gears 74 may be utilized without departing from the scope of the present disclosure, including a single odd numbered gear, the plurality of odd numbered gears 72 illustrated in FIG. 1 includes a third gear 76 and a fifth gear 78. A second gearset 80 is rotatably coupled to and carried on the second layshaft 48. The second gearset 80 includes a duplicate first gear 82 and a plurality of even numbered gears 84. Again, while any number of even numbered gears 84 may be utilized, including a single even numbered gear, the plurality of even numbered gears 84 illustrated in FIG. 1 includes a second gear 86, a fourth gear 88, and a sixth gear 90. Of course it should be appreciated that this arrangement of gears is merely exemplary and that other arrangements are envisioned. By way of example and without limitation, placement of the reverse gear 74 may be reversed where the reverse gear 74 is rotatably coupled to and carried on the second layshaft 48. Further it should be appreciated that the term "rotatably coupled to" as used herein means that the gears of the first gearset 68 and the gears of the second gearset 80, when engaged, rotate with the first layshaft 46 and the second layshaft 48 respectively. Engagement of the gears of the first gearset 68 with the first layshaft 46 and engagement of the gears of the second gearset 80 with the second layshaft 48 can be accomplished by any of the couplings known in the art, including without limitation, dog clutches or mechanical diodes (not shown). Alternatively, the gears of the first gearset 68 and the gears of the second gearset 80 may always be engaged where the gears of the first gearset 68 and the gears of the second gearset 80 are fixed to the first and second layshafts 46, 48 respectively. By way of example and without limitation, the gears of the first and second gearsets 68, 80 may be fixed to the first and second layshafts 46, 48 respectively by a splined, bolted, or welded connection or may be integral with the first and second layshafts 46, 48. The term "carried on" as used herein means that the gears of the first gearset 68 and the gears of the second gearset 80 are disposed on and are supported by the first layshaft 46 and the second layshaft 48 respectively.

Still referring to FIG. 1, the dual-clutch transmission assembly 20 includes a first intermediate shaft 92 and a second intermediate shaft 94. The first intermediate shaft 92 extends parallel to the first layshaft 46 and is transversely spaced from the first layshaft 46. More specifically, the first intermediate shaft 92 is positioned adjacent the first layshaft 46 and may be positioned between the first layshaft 46 and the second layshaft 48. The second intermediate shaft 94 extends parallel to the second layshaft 48 and is transversely spaced from the second layshaft 48. More specifically, the second intermediate shaft 94 is positioned adjacent the second layshaft 48 and may also be positioned between the first layshaft 46 and the second layshaft 48. Therefore, the first and second layshafts 46, 48 may be arranged parallel to one another and the first and second intermediate shafts 92, 94 may be arrangement parallel to one another and parallel to the first and second layshafts 46, 48. Further, the first and second intermediate shafts 92, 94 may be positioned between the first and second layshafts 46, 48 such that the first and second intermediate shafts 92, 94 are positioned in the same common plane 50 as the first and second layshafts 46, 48. Where the first and second intermediate shafts 92, 94 are positioned in the same common plane 50 as the first and second layshafts 46, 48, the dual-clutch transmission assembly 20 may be constructed in a compact manner such that packaging advantages may be realized.

A third gearset 96 is rotatably coupled to and carried on the first intermediate shaft 92. The third gearset 96 is also arranged in meshing engagement with the primary first gear 70, the plurality of odd numbered gears 72, and the reverse gear 74 of the first gearset 68. Accordingly, the gears of the third gearset 96 are aligned with corresponding counter-part gears of the first gearset 68 such that the first gearset 68 transfers rotational energy and torque from the first layshaft 46 to the third gearset 96 and thus the first intermediate shaft 92 during operation of the of the dual-clutch transmission assembly 20. By way of example and without limitation, the third gearset 96 may more specifically include: a primary first output gear 98 arranged in meshing engagement with the primary first gear 70 of the first gearset 68, a third output gear 100 arranged in meshing engagement with the third gear 76 of the first gearset 68, a fifth output gear 102 arranged in meshing engagement with the fifth gear 78 of the first gearset 68, and a reverse output gear 104 arranged in meshing engagement with the reverse gear 74 of the first gearset 68.

Similarly, a fourth gearset 106 is rotatably coupled to and carried on the second intermediate shaft 94. The fourth gearset 106 is arranged in meshing engagement with the duplicate first gear 82 and the plurality of even numbered gears 84 of the second gearset 80. Accordingly, the gears of the fourth gearset 106 are aligned with corresponding counter-part gears of the second gearset 80 such that the second gearset 80 transfers rotational energy and torque from the second layshaft 48 to the fourth gearset 106 and thus the second intermediate shaft 94 during operation of the of the dual-clutch transmission assembly 20. By way of example and without limitation, the fourth gearset 106 may more specifically include: a duplicate first output gear 108 arranged in meshing engagement with the duplicate first gear 82 of the second gearset 80, a second output gear 110 arranged in meshing engagement with the second gear 86 of the second gearset 80, a fourth output gear 112 arranged in meshing engagement with the fourth gear 88 of the second gearset 80, and a sixth output gear 114 arranged in meshing engagement with the sixth gear 90 of the second gearset 80. Engagement of the gears of the third gearset 96 with the first intermediate shaft 92 and engagement of the gears of the fourth gearset 106 with the second intermediate shaft 94 can be accomplished by any of the couplings known in the art, including without limitation, dog clutches or mechanical diodes (not shown). Alternatively, the gears of the third gearset 96 and the gears of the fourth gearset 106 may always be engaged where the gears of the third gearset 96 and the gears of the fourth gearset 106 are fixed to the first and second intermediate shafts 92, 94 respectively. By way of example and without limitation, the gears of the third and fourth gearsets 96, 106 may be fixed to the first and second intermediate shafts 92, 94 respectively by a splined, bolted, or welded connection or may be integral with the first and second intermediate shafts 92, 94.

A first intermediate shaft output gear 116 is rotatably coupled to and carried on the first intermediate shaft 92. The first intermediate shaft output gear 116 is arranged in meshing engagement with the transmission output gear 38 such that the first intermediate shaft output gear 116 transfers rotational energy and torque from the first intermediate shaft 92 to the transmission output gear 38 and thus the transmission output shaft 30 during operation of the of the dual-clutch transmission assembly 20. A second intermediate shaft output gear 118 is rotatably coupled to and carried on the second intermediate shaft 94. The second intermediate shaft output gear 118 is arranged in meshing engagement with the transmission output gear 38 opposite the first intermediate shaft output gear 116. Accordingly, the second intermediate shaft output gear 118 transfers rotational energy and torque from the second intermediate shaft 94 to the transmission output gear 38 and thus the transmission output shaft 30 during operation of the of the dual-clutch transmission assembly 20. In this way, torque may be applied to the transmission output gear 38 and thus the transmission output shaft 30 simultaneously by both the first intermediate shaft 92 and the second intermediate shaft 94 through the first intermediate shaft output gear 116 and the second intermediate shaft output gear 118 respectively. By way of non-limiting example, the first intermediate shaft output gear 116 may be fixed to the first intermediate shaft 92 by a splined, bolted, or welded connection or may be integral with the first intermediate shaft 92 and the second intermediate shaft output gear 118 may be fixed to the second intermediate shaft 94 by a splined, bolted, or welded connection or may be integral with the second intermediate shaft 94.

Each of the first and second layshafts 46, 48 receives torque from the transmission input shaft 28 in response to contemporaneous engagement of the primary first gear 70, the duplicate first gear 82, the first clutch 60, and the second clutch 62. Such contemporaneous engagement may be effectuated during launch of the vehicle to split the torque applied to the first and second clutches 60, 62. It should be appreciated that the term "contemporaneous", as used herein, means that the primary first gear 70, the duplicate first gear 82, and the first and second clutches 60, 62 are all in an engaged state at a single moment in time; however, this term does not require the primary first gear 70, the duplicate first gear 82, and the first and second clutches 60, 62 to be switched to the engaged state or switched back to a disengaged state at the same time as sequential engagement of the primary first gear 70, the duplicate first gear 82, and the first and second clutches 60, 62 is also envisioned and within the scope of the subject disclosure. Advantageously, this arrangement reduces the amount of heat generated in the first clutch 60 and/or in the second clutch 62 during operation of the dual-clutch transmission assembly 20, especially during repeated vehicle launches where heat generation in the first clutch 60 and/or second clutch 62 can be problematic and detrimental to the structural integrity and performance of the first clutch 60 and/or second clutch 62.

During vehicle launch, the primary first gear 70, the duplicate first gear 82, and the first and second clutches 60, 62 are engaged such that the torque applied to the transmission input shaft 28 is split into two torque flow paths 120, 122 including a first torque flow path 120 and a second torque flow path 122 that pass through the first and second layshafts 46, 48, respectively. The two torque flow paths 120, 122 pass from the first and second layshafts 46, 48, through the primary first gear 70 and the duplicated first gear 82, through the primary first output gear 98 and the duplicate first output gear 108, and thus to the first and second intermediate shafts 92, 94. The two torque flow paths 120, 122 are then re-combined at the transmission output gear 38. In this way, each of the first and second clutches 60, 62 experience only a portion of the torque that is applied to the transmission input shaft 28, therefore reducing heat generation in the first clutch 60 and/or the second clutch 62.

To provide different forward gear ratios, the gears of the first gearset 68 and the gears of the second gearset 80 may be provided with different diameters. For example, the plurality of odd numbered gears 72 of the first gearset 68 may have gear diameters that increase with each higher numbered gear and the plurality of even numbered gears 84 of the second gearset 80 may have gear diameters that increase with each higher numbered gear. As shown in FIG. 1, the primary first gear 70 may have a primary first gear diameter 124, the third gear 76 may have a third gear diameter 126 that is larger than the primary first gear diameter 124, and the fifth gear 78 may have a fifth gear diameter 128 that is larger than the third gear diameter 126. The second gear 86 may have a second gear diameter 130, the fourth gear 88 may have a fourth gear diameter 132 that is larger than the second gear diameter 130, and the sixth gear 90 may have a sixth gear diameter 134 that is larger than the fourth gear diameter 132. The reverse gear 77 has a reverse gear diameter 136 and the duplicate first gear 82 has a duplicate first gear diameter 138. The primary first gear diameter 124 is equal to the duplicate first gear diameter 138 such that the primary first gear 70 and the duplicate first gear 82 may be engaged at the same time without causing the first and second intermediate shaft output gears 116, 118 to rotate at different speeds and in turn bind with the transmission output gear 38. In addition, since the primary first gear diameter 124 is equal to the duplicate first gear diameter 138, the primary first gear 70 and the duplicate first gear 82 distribute the torque produced by the engine 22 evenly between the first clutch 60 and the second clutch 62 during vehicle launch.

The gears of the third and fourth gearsets 96, 106 are also provided with different diameters so that the gears of the third gearset 96 can mesh with the gears of the first gearset 68 and so that the gears of the fourth gearset 106 can mesh with the gears of the second gearset 80. In keeping with the arrangement described above and shown in FIG. 1, the gears of the third gearset 96 may decrease in diameter with each higher numbered gear. For example, the primary first output gear 98 may have a primary first output gear diameter 140 that is larger than the primary first gear diameter 124, the third output gear 100 may have a third output gear diameter 142 that is larger than the third gear diameter 126 and smaller than the primary first output gear diameter 140, and the fifth output gear 102 may have a fifth output gear diameter 144 that is smaller than the fifth gear diameter 128 and the third output gear diameter 142. Similarly, the gears of the fourth gearset 106 may decrease in diameter with each higher numbered gear. For example, the second output gear 110 may have a second output gear diameter 146 that is larger than the second gear diameter 130, the fourth output gear 112 may have a fourth output gear diameter 148 that is larger than the fourth gear diameter 132 and smaller than the second output gear diameter 146, and the sixth output gear 114 may have a sixth output gear diameter 150 that is smaller than the sixth gear diameter 134 and the fourth output gear diameter 148. The reverse output gear 104 may have a reverse output gear diameter 152 that is larger than the reverse gear diameter 136 and the duplicate first output gear 108 may have a duplicate first output gear diameter 154 that is larger than the duplicate first gear diameter 138. As a result, a total of six different forward gear ratios and a single reverse gear ratio are provided by the arrangement shown in FIG. 1.

Figure 2:
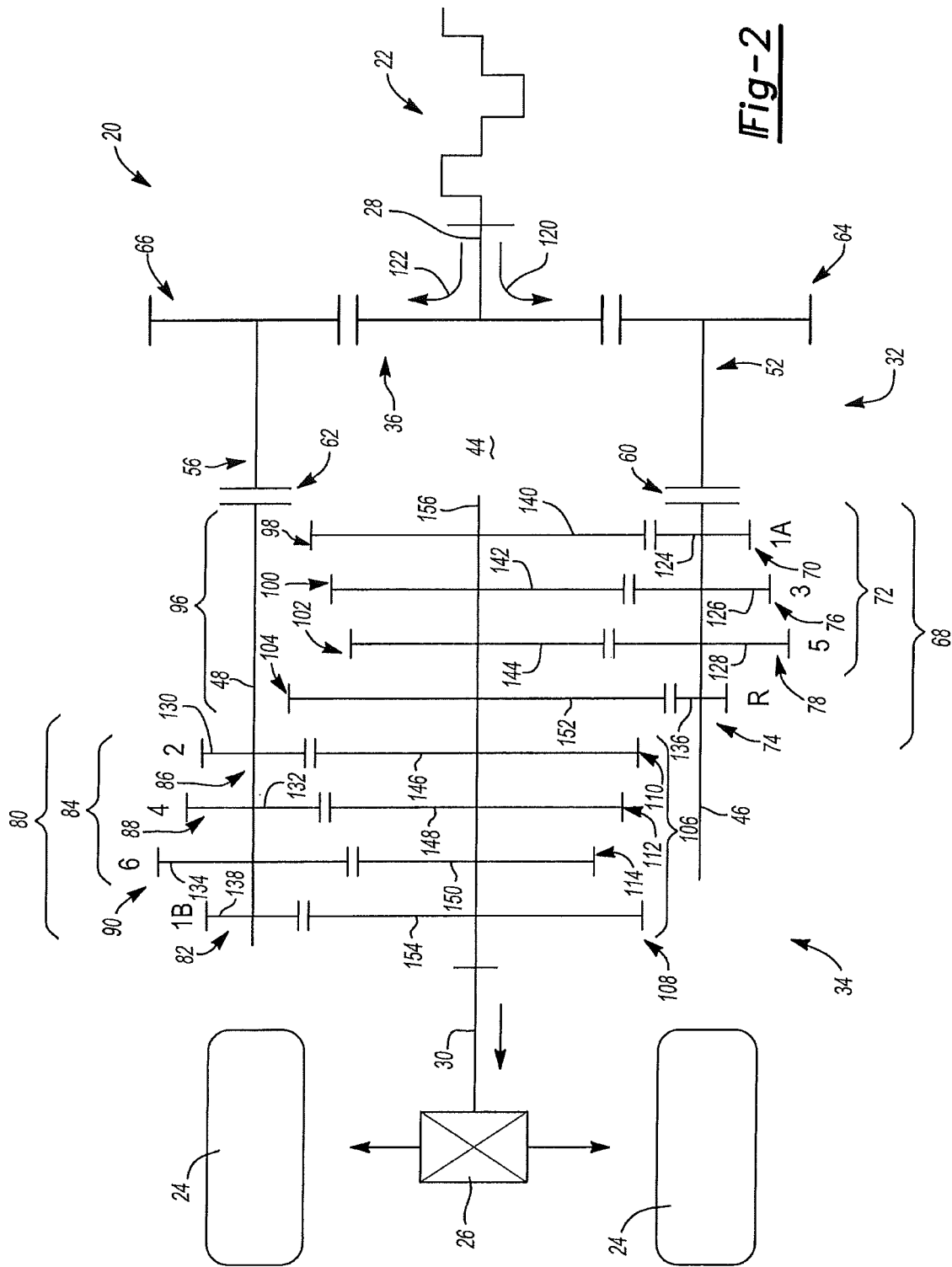
FIG. 2 is a schematic view of another exemplary dual-clutch transmission assembly constructed in accordance with the subject disclosure where the third and fourth gearsets are arranged one after the other on a single intermediate shaft.
Figure 3:
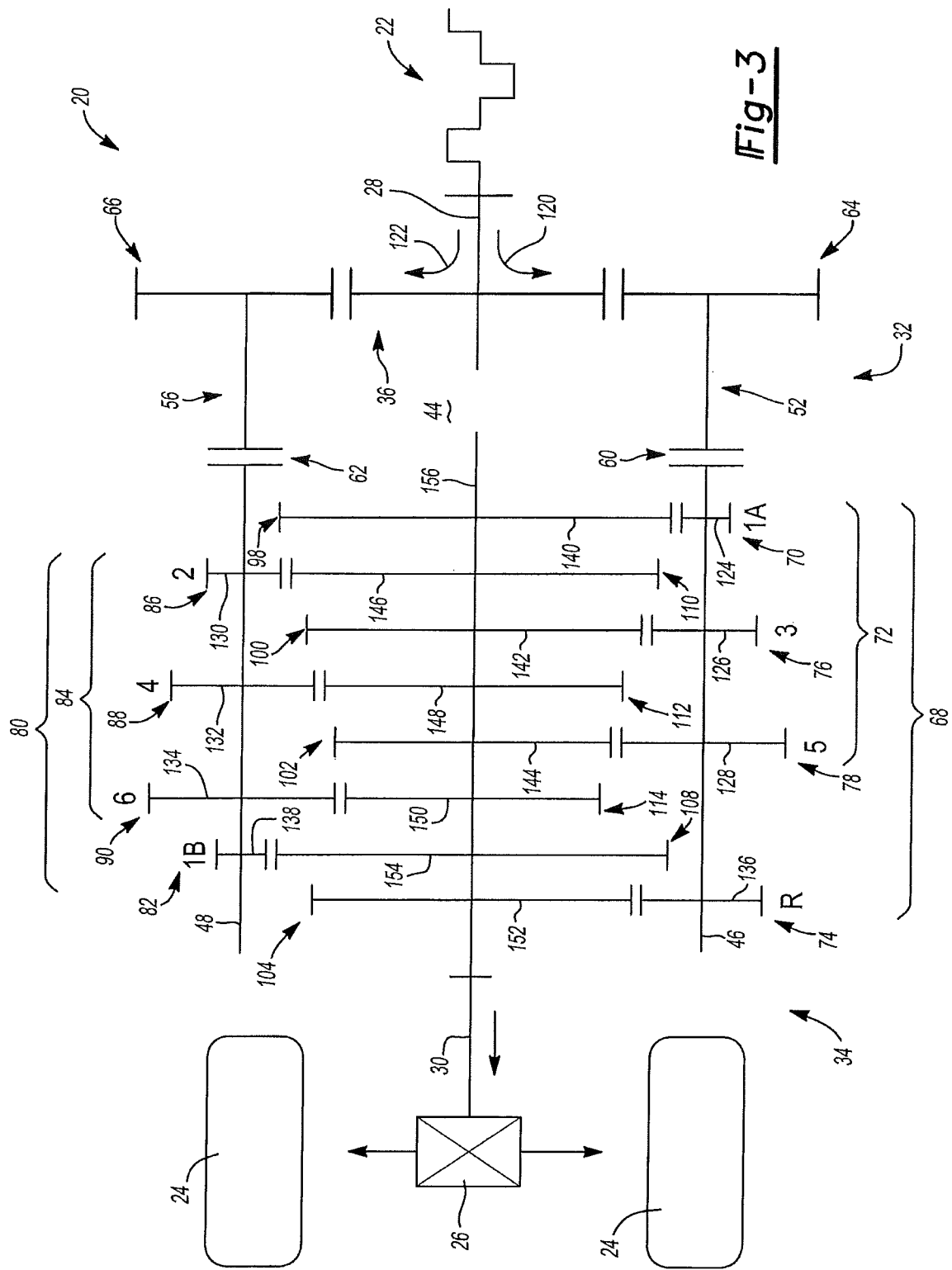
FIG. 3 is a schematic view of another exemplary dual-clutch transmission assembly constructed in accordance with the subject disclosure where gears of the third and fourth gearsets are sequentially arranged along the single intermediate shaft.

In FIGS. 2 and 3, alternative configurations of the dual-clutch transmission assembly 20 are illustrated where the first and second intermediate shafts 92, 94 of the configuration shown in FIG. 1 have been replaced by a single intermediate shaft 156. Accordingly, the transmission output gear 38, the first intermediate shaft output gear 116, and the second intermediate shaft output gear 118 of the configuration shown in FIG. 1 may also be eliminated. Instead, the single intermediate shaft 156 may be directly coupled to the transmission output shaft 30 or may be integral with the transmission output shaft 30. In accordance with the configuration shown in FIGS. 2 and 3, both the third and fourth gearsets 96, 106 are rotatably coupled to and carried on the single intermediate shaft 156. By way of non-limiting example, the gears of the third and fourth gearsets 96, 106 may be selectively engaged to the single intermediate shaft 156 by dog clutches, mechanical diodes, and the like or may be fixed with the single intermediate shaft 156 by splined, bolted, or welded connections and the like. In FIG. 2, the third gearset 96 is disposed on the single intermediate shaft 156 adjacent the fourth gearset 106 such that the primary first output gear 98, the third output gear 100, the fifth output gear 102, and the reverse output gear 104 are disposed on one side of the single intermediate shaft 156 while the second output gear 110, the fourth output gear 112, the sixth output gear 114, and the duplicate first output gear 108 are disposed on an opposite side of the single intermediate shaft 156. Alternatively, in FIG. 3, the gears of the third and fourth gearsets 96, 106 are disposed along in the single intermediate shaft 156 in sequential order where the gears are arranged in the following exemplary order along the single intermediate shaft 156: the primary first output gear 98, the second output gear 110, the third output gear 100, the fourth output gear 112, the fifth output gear 102, the sixth output gear 114, the duplicate first output gear 108, and the reverse output gear 104. In both FIGS. 2 and 3, the single intermediate shaft 156 is disposed adjacent to the first and second layshafts 46, 48. More particularly, the single intermediate shaft 156 may be positioned between the first and second layshafts 46, 48 and may be arranged parallel to the first and second layshafts 46, 48 such that the gears of the first and second gearsets 68, 80 are aligned in meshing engagement with the gears of the third and fourth gearsets 96, 106. Accordingly, FIGS. 2 and 3 show simplified and dimensionally smaller configurations that can provide additional cost and packaging advantages.

Figure 4:
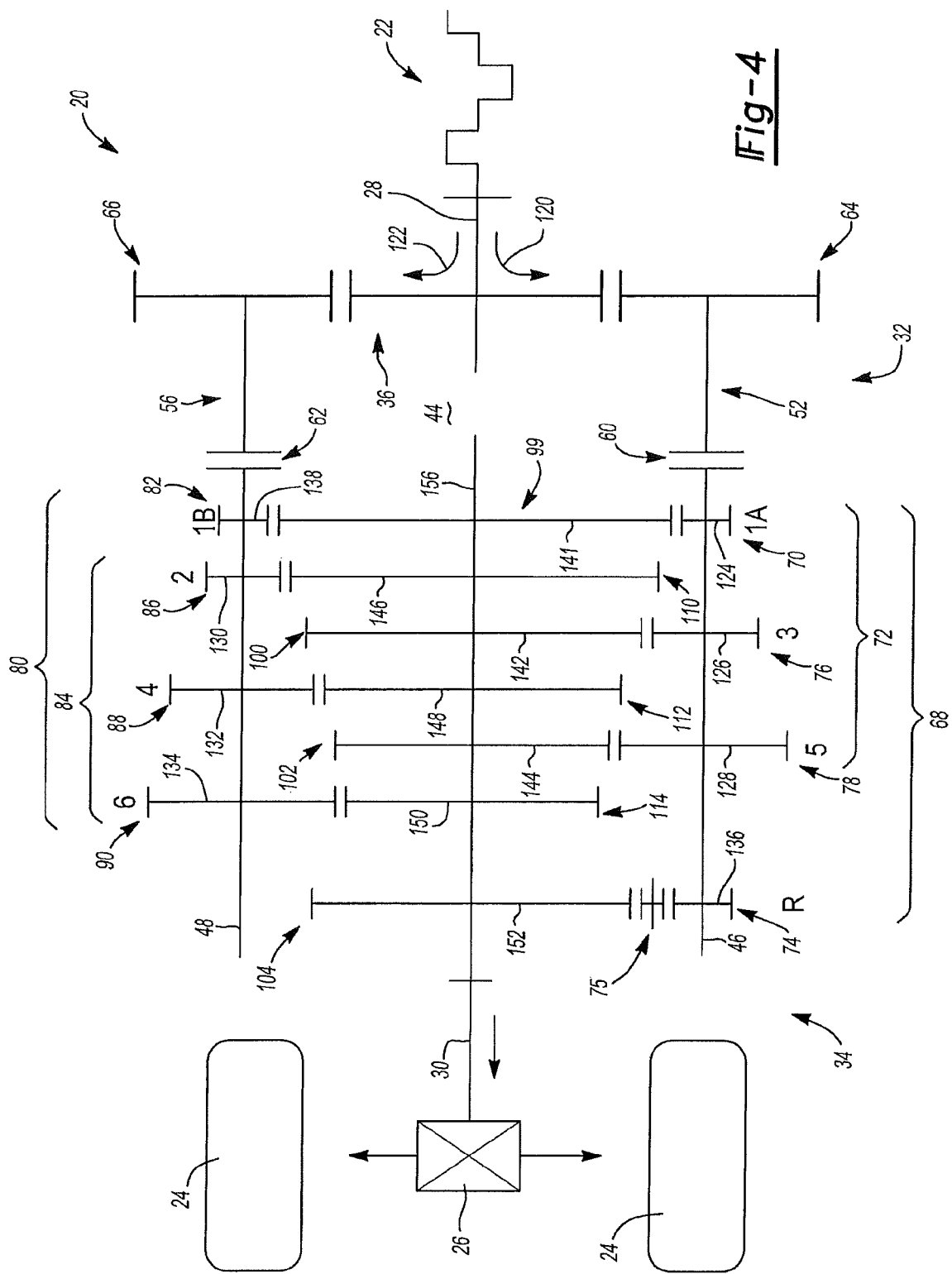
FIG. 4 is a schematic view of another exemplary dual-clutch transmission assembly constructed in accordance with the subject disclosure where a primary first gear and a duplicate first gear are meshingly engaged with a first output gear that is carried on the single intermediate shaft.
Figure 5:
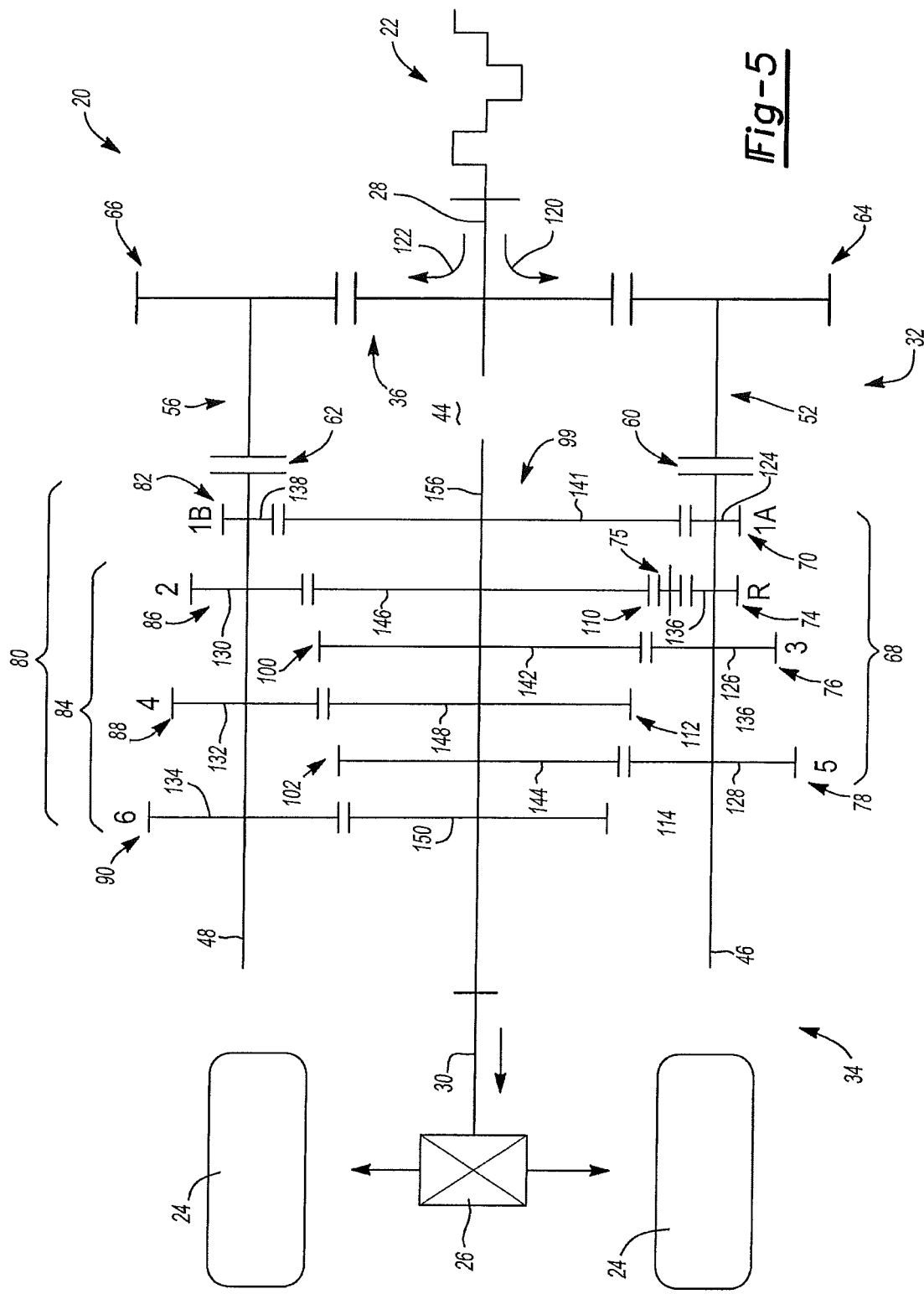
FIG. 5 is a schematic view of another exemplary dual-clutch transmission assembly constructed in accordance with the subject disclosure where the primary first gear and the duplicate first gear are meshingly engaged with the first output gear and where a second gear and a reverse gear are meshingly engaged with a second output gear that is carried on the single intermediate shaft.

In FIGS. 4 and 5, alternative configurations of the dual-clutch transmission assembly 20 are illustrated. The arrangement of the primary first gear 70 and the duplicate first gear 82 in these configurations yields a more compact dual-clutch transmission assembly 20. Advantageously, the positioning of the duplicate first gear 82 in these configurations allows the duplicate first gear 82 to be added without increasing the overall dimensions (i.e. length, height, and width) of the dual-clutch transmission assembly 20. As a result, transmission housings from other dual-clutch transmission assemblies that do not have a duplicate first gear can be utilized with little to no modification.

In FIG. 4, the positioning of the duplicate first gear 82 along the second layshaft 48 has been modified from the position shown in FIGS. 2 and 3. With reference to FIG. 4, the duplicate first gear 82 is positioned in meshing engagement with a first output gear 99. The primary first gear 70 is also positioned in meshing engagement with the first output gear 99 such that the primary first gear 70, the duplicate first gear 82, and the first output gear 99 are all in alignment with one another. Stated another way, in FIG. 4, the primary first gear 70 is axially positioned on the first layshaft 46 between the first clutch 60 and the third gear 76 and the duplicate first gear 82 is axially positioned on the second layshaft 48 between the second clutch 62 and the second gear 86. The primary first gear 70 and the duplicate first gear 82 commonly share the first output gear 99 and both the primary first gear 70 and the duplicate first gear 82 cooperate to drive the first output gear 99 when the first and second clutches 60, 62 are engaged.

The primary first gear diameter 124 and the duplicate first gear diameter 138 are equal such that the primary first gear 70 and the duplicate first gear 82 can be concurrently engaged with the first output gear 99 without binding. The first output gear 99 is carried on and rotates with the single intermediate shaft 156. By way of non-limiting example, the first output gear 99 may be selectively engaged to the single intermediate shaft 156 by dog clutches, mechanical diodes, and the like or may be fixed with the single intermediate shaft 156 by splined, bolted, or welded connections and the like. The first output gear 99 has a first output gear diameter 141, which may be larger than the second output gear diameter 146. During vehicle launch, the primary first gear 70, the duplicate first gear 82, and the first and second clutches 60, 62 are engaged such that the torque applied to the transmission input shaft 28 is split between the first torque flow path 120 and the second torque flow path 122. The first torque flow path 120 passes through the first clutch 60, through the primary first gear 70, through the first output gear 99, and to the single intermediate shaft 156. Similarly, the second torque flow path 122 passes through the second clutch 62, through the duplicate first gear 82, through the first output gear 99, and to the single intermediate shaft 156. Accordingly, the first and second torque flow paths 120, 122 are recombined at the first output gear 99. In this way, the duplicate first output gear 108 shown in FIGS. 2 and 3 is eliminated for improved packaging, reduced cost, and weight savings.

The dual-clutch transmission 20 in FIG. 4 may optionally include a reverse idler gear 75 disposed in meshing engagement between the reverse gear 74 and the reverse output gear 104. The reverse idler gear 75 reverses the rotation of the reverse output gear 104 relative to the reverse gear 74. Since the single intermediate shaft 156 rotates with the reverse output gear 104 and the first layshaft 46 rotates with the reverse gear 74 when the reverse gear 74 is engaged, the reverse idler gear 75 allows the first layshaft 46 and the single intermediate shaft 156 to rotate in opposite directions. Accordingly, the dual-clutch transmission 20 illustrated in FIG. 4 may provide reverse by disengaging the second clutch 62 and by engaging both the first clutch 60 and the reverse gear 74. In configurations where the reverse idler gear 75 is not included, the first layshaft 46 may rotated in one direction when one of the gears in the plurality of odd numbered gears 72 is engaged and the first layshaft 46 may rotate in an opposite direction when the reverse gear 74 is engaged. This reversal in the direction of rotation of the first layshaft 46 may be effectuated by reversing the direction of rotation of the transmission input shaft 28. The direction of rotation of the transmission input shaft 28 may be reversed by separate gearset (not shown) disposed between the engine 22 and the transmission input shaft 28. Alternatively, the direction of rotation of the engine 22 itself may be reversed particularly where the engine 22 is electric.

In FIG. 5, the positioning of the duplicate first gear 82 along the second layshaft 48 and the positioning of the reverse gear 74 along the first layshaft 46 has been modified from the positions shown in FIGS. 2 and 3. With reference to FIG. 5, both the primary first gear 70 and the duplicate first gear 82 are positioned in meshing engagement with the first output gear 99. Therefore, the primary first gear 70, the duplicate first gear 82, and the first output gear 99 of the dual-clutch transmission 20 are all in alignment with one another. Like in FIG. 4, the first output gear 99 in FIG. 5 is carried on and rotates with the single intermediate shaft 156 and the first output gear diameter 141 of the first output gear 99 may be larger than the second output gear diameter 146.

As in FIGS. 2 through 4, the second gear 86 in FIG. 5 is positioned in meshing engagement with the second output gear 110. However, in the configuration shown in FIG. 5, the reverse gear 74 is also positioned in meshing engagement with the second output gear 110 via reverse idler gear 75. The reverse idler gear 75 is disposed in meshing engagement between the reverse gear 74 and the second output gear 110. Accordingly, the second gear 86, the second output gear 110, the reverse gear 74, and the idler gear 75 of the dual-clutch transmission 20 are all in alignment with one another. Stated another way, in FIG. 5, both the primary first gear 70 and the reverse gear 74 are axially positioned on the first layshaft 46 between the first clutch 60 and the third gear 76 and the duplicate first gear 82 is axially positioned on the second layshaft 48 between the second clutch 62 and the second gear 86. More specifically, the primary first gear 70 is axially positioned on the first layshaft 46 between the first clutch 60 and the reverse gear 74 and the reverser gear 74 is axially positioned on the first layshaft 46 between the third gear 76 and the primary first gear 70. The reverse idler gear 75 reverses rotation of the second output gear 110 relative to the reverse gear 74 such that the second output gear 110 can be utilized when the second gear 86 is engaged and when the reverse gear 74 is engaged.

During vehicle launch, the primary first gear 70, the duplicate first gear 82, and the first and second clutches 60, 62 illustrated in FIG. 5 are engaged such that the torque applied to the transmission input shaft 28 is split between the first torque flow path 120 and the second torque flow path 122. The first torque flow path 120 passes through the first clutch 60, through the primary first gear 70, through the first output gear 99, and to the single intermediate shaft 156. Similarly, the second torque flow path 122 passes through the second clutch 62, through the duplicate first gear 82, through the first output gear 99, and to the single intermediate shaft 156. Accordingly, the first and second torque flow paths 120, 122 are recombined at the first output gear 99. After vehicle launch, the dual-clutch transmission 20 may be shifted where the primary first gear 70, the duplicate first gear 82, and the first clutch 60 are disengaged. During the shift, the second gear 86 is engaged and the second clutch 62 either remains engaged or is temporarily disengaged and then is re-engaged. Since the single intermediate shaft 156 rotates with the second output gear 110 and the first layshaft 46 rotates with the reverse gear 74 when the reverse gear 74 is engaged, the reverse idler gear 75 allows the first layshaft 46 and the single intermediate shaft 156 to rotate in opposite directions. Accordingly, the dual-clutch transmission 20 illustrated in FIG. 5 may provide reverse by disengaging the second clutch 62 and by engaging both the first clutch 60 and the reverse gear 74.

With reference to FIG. 5, the primary first gear 70 and the duplicate first gear 82 commonly share the first output gear 99 and both the primary first gear 70 and the duplicate first gear 82 cooperate to drive the first output gear 99 when both the first and second clutches 60, 62 are engaged. In addition, the second gear 86 and the reverse gear 74 commonly share the second output gear 110 where the second output gear 110 is driven in one rotational direction by the second gear 86 when the first clutch 60 is disengaged and the second clutch 62 is engaged and where the second output gear 110 is driven in an opposite rotational direction by the reverse gear 74 and the reverse idler gear 75 when the first clutch 60 is engaged and the second clutch 62 is disengaged. This arrangement therefore eliminates both the duplicate first output gear 108 and the reverse output gear 104 illustrated in FIGS. 2 and 3 for improved packaging, reduced cost, and weight savings.

Figure 6:
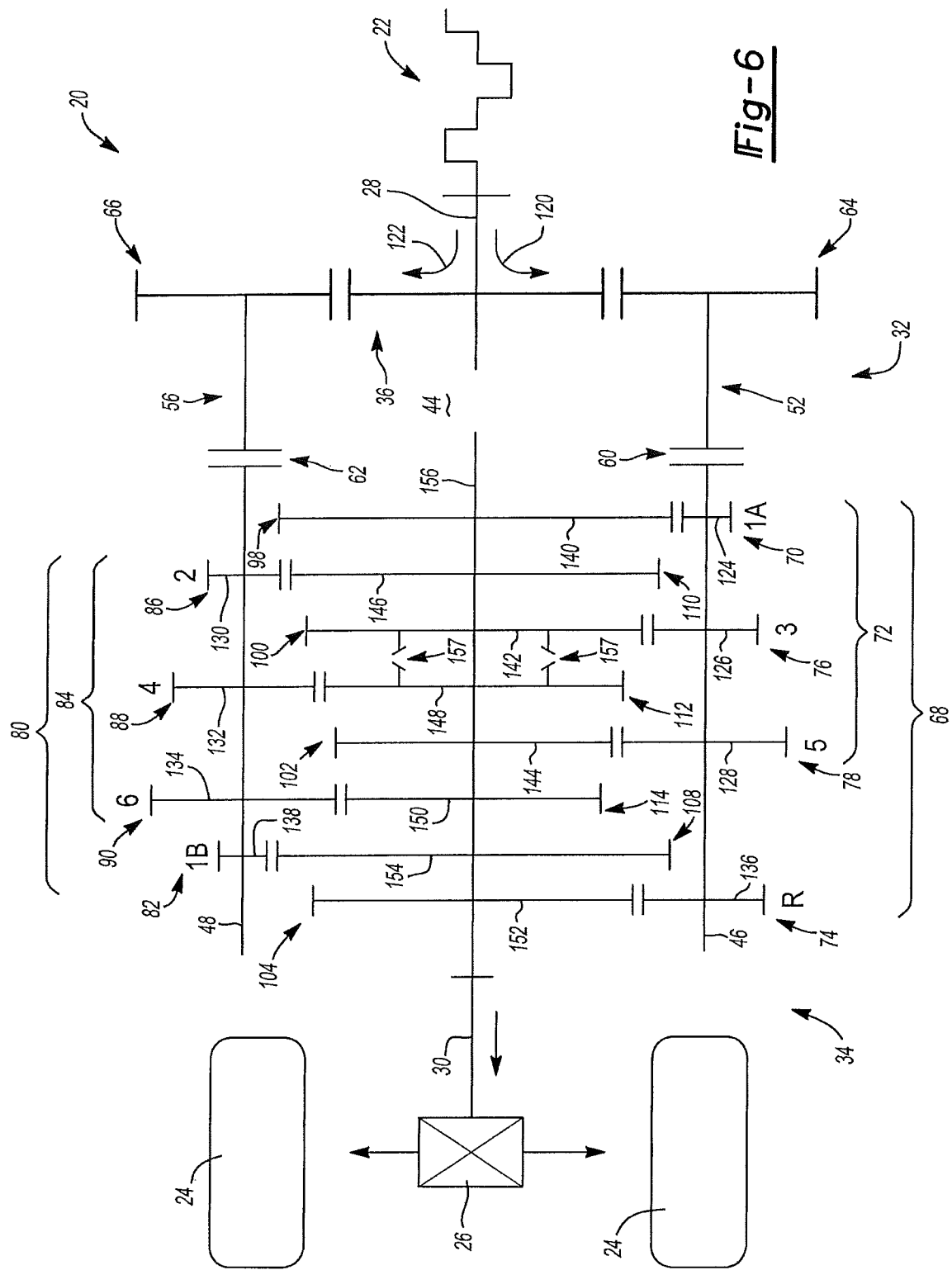
FIG. 6 is a schematic view of another exemplary dual-clutch transmission assembly constructed in accordance with the subject disclosure where a transfer clutch extends between third and fourth output gears to selectively provide additional gear ratios without increasing the number of output gears.
Figure 7:
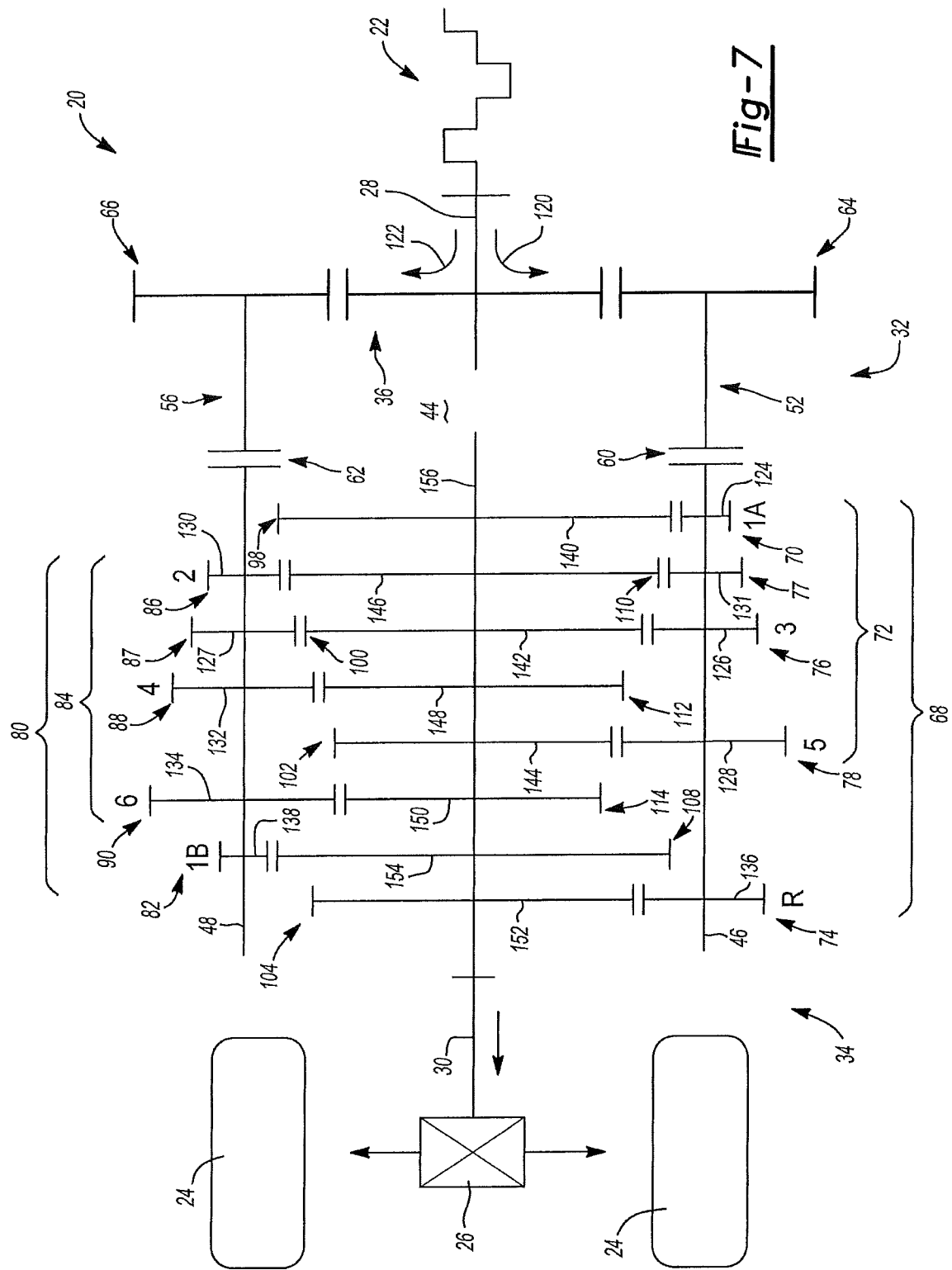
FIG. 7 is a schematic view of another exemplary dual-clutch transmission assembly constructed in accordance with the subject disclosure where a second gear and a second transfer gear are meshingly engaged with a second output gear and a third gear and a third transfer gear are meshingly engaged with the third output gear to provide additional gear ratios without increasing the number of output gears.

FIGS. 6 and 7 illustrate alternative configurations of the dual-clutch transmission assembly 20 shown in FIG. 3. In FIGS. 6 and 7 the dual-clutch transmission assembly 20 of FIG. 3 has been modified to provide additional ratios without increasing the number of gears and thus the dimensions of the dual-clutch transmission assembly 20. In FIGS. 6 and 7, the primary first output gear 98, the duplicate first output gear 108, the second output gear 110, the third output gear 100, the fourth output gear 112, the fifth output gear 102, the sixth output gear 114, and the reverse output gear 104 are carried on the single intermediate shaft 156 and are selectively coupled with the single intermediate shaft 156 such that they may be engaged and disengaged with the single intermediate shaft 156. By way of example and without limitation, engagement of the primary first output gear 98, the duplicate first output gear 108, the second output gear 110, the third output gear 100, the fourth output gear 112, the fifth output gear 102, the sixth output gear 114, and the reverse output gear 104 with the single intermediate shaft 156 may be accomplished by dog clutches, mechanical diodes, and the like. When any one of the primary first output gear 98, the duplicate first output gear 108, the second output gear 110, the third output gear 100, the fourth output gear 112, the fifth output gear 102, the sixth output gear 114, and the reverse output gear 104 is engaged with the single intermediate shaft 156, that gear rotates with the single intermediate shaft 156. When any one of the primary first output gear 98, the duplicate first output gear 108, the second output gear 110, the third output gear 100, the fourth output gear 112, the fifth output gear 102, the sixth output gear 114, and the reverse output gear 104 is disengaged with the single intermediate shaft 156, that gear rotates freely relative to the single intermediate shaft 156 (i.e. free-wheels on the single intermediate shaft 156).

With reference to FIG. 6, the dual-clutch assembly 20 further includes a transfer clutch 157 that extends longitudinally between the third output gear 100 and the fourth output gear 112. When the transfer clutch 157 is engaged, the transfer clutch 157 rotatably couples the third output gear 100 with the fourth output gear 112 such that the third output gear rotates with the fourth output gear 112. When the transfer clutch 157 is disengaged, the third output gear 100 may rotate at a different speed relative to the fourth output gear 112. The transfer clutch 157 provides two or more ratios where the third gear 76 acts as a driven gear. This stands in contrast to the configuration illustrated in FIG. 3, where each gear carried on the first and second layshafts 46, 48 (including the third gear 76) provides only a single ratio. Like in FIG. 3, one ratio for the third gear 76 is provided where the first clutch 60 is engaged (i.e. closed) and the second clutch 62 is disengaged (i.e. open). The third gear 76 is engaged and rotates with the first layshaft 46, which drives rotation of the third output gear 100. The third output gear 100 is engaged and rotates with the single intermediate shaft 156, which drives rotation of the output shaft 30. The transfer clutch 157 is disengaged such that there is no torque transfer between the third output gear 100 and the fourth output gear 112 across the transfer clutch 157. When this ratio for the third gear 76 is selected, power flows from the transmission input shaft 28, through the transmission input gear 36, through the first layshaft input gear 64, through the first input hub 52, through the first clutch 60, through the first layshaft 46, through the third gear 76, through the third output gear 100, through the single intermediate shaft 156, and to the output shaft 156. An additional ratio for the third gear 76 is provided where the first clutch 60 is engaged (i.e. closed) and the second clutch 62 is disengaged (i.e. open). The third gear 76 is engaged and rotates with the first layshaft 46, which drives rotation of the third output gear 100. Both the third output gear 100 and the fourth output gear 112 are disengaged and rotate freely on the single intermediate shaft 156. The transfer clutch 157 is engaged such that the third output gear 100 and the fourth output gear 112 rotate (i.e. free-wheel) together on the single intermediate shaft 156. The fourth output gear 112 is meshingly engaged with the fourth gear 88 and drives the fourth gear 88. The fourth gear 88 is engaged with the second layshaft 48. Any one of the gears carried on the second layshaft 48 may be engaged to send torque back to the single intermediate shaft 156, thus creating the additional ratio. By way of example and without limitation, the sixth gear 90 may be engaged with the second layshaft 48 such that the sixth gear 90 is driven by the second layshaft 48, which is driven by the fourth gear 88. The sixth gear 90 is meshingly engaged with the sixth output gear 114 and therefore drives rotation of the sixth output gear 114. The sixth output gear 114 is engaged with the single intermediate shaft 156, which drives rotation of the output shaft 30. Accordingly, to provide the additional ratio for the third gear 76, power flows from the transmission input shaft 28, through the transmission input gear 36, through the first layshaft input gear 64, through the first input hub 52, through the first clutch 60, through the first layshaft 46, through the third gear 76, through the third output gear 100, through the transfer clutch 157, through the fourth output gear 112, through the fourth gear 88, through the second layshaft 48, through the sixth gear 90, through the sixth output gear 114, through the single intermediate shaft 156, and to the output shaft 30. Notwithstanding the example provided above, it should be appreciated that any one of the other gears carried on the second layshaft 48 may be engaged with the second layshaft 48 to be driven by the fourth gear 88 and re-direct torque back to the single intermediate shaft 156. Other alternatives are possible where the second clutch 62 is engaged (i.e. closed) and the first clutch 60 is disengaged (i.e. open) such that the fourth gear 88 acts as the driven gear instead of the third gear 76.

In FIG. 7, the transfer clutch 157 of the dual-clutch assembly 20 shown in FIG. 6 is replaced by transfer gears 77, 87 that are disposed in meshing engagement with the second output gear 110 and the third output gear 100. Referring to FIG. 7, the transfer gears 77, 87 include a first transfer gear 77 and a second transfer gear 87. The first transfer gear 77 is disposed in meshing engagement with the second output gear 110 opposite the second gear 86. The first transfer gear 77 is carried on the first layshaft 46 and is selectively coupled to the first layshaft 46 such that the first transfer gear 77 rotates with the first layshaft 46 when the first transfer gear 77 is engaged. The second transfer gear 87 is disposed in meshing engagement with the third output gear 100 opposite the third gear 76. The second transfer gear 87 is carried on the second layshaft 48 and is selectively coupled to the second layshaft 48 such that the second transfer gear 87 rotates with the second layshaft 48 when the second transfer gear 87 is engaged. By way of example and without limitation, the first and second transfer gears 77, 87 may be selectively coupled to the first and second layshafts 46, 48 respectively by dog clutches, mechanical diodes, and the like. The first transfer gear 77 has a first transfer gear diameter 131 that is equal to the second gear diameter 130. The second transfer gear 87 has a second transfer gear diameter 127 that is larger than the first transfer gear diameter 131 and that is equal to the third gear diameter 126. The transfer gears 77, 87 provide two or more ratios where the second gear 86 acts as the driven gear and two or more ratios where the third gear 76 acts as the driven gear. This stands in contrast to the configuration illustrated in FIG. 3, where each gear carried on the first and second layshafts 46, 48 (including the second and third gears 76, 86) provides only a single ratio. Like in FIG. 3, one ratio for the second gear 86 is provided where the first clutch 60 is disengaged (i.e. open) and the second clutch 62 is engaged (i.e. closed). The second gear 86 is engaged and rotates with the second layshaft 48, which drives rotation of the second output gear 110. The second output gear 110 is engaged and rotates with the single intermediate shaft 156, which drives rotation of the output shaft 30. The first transfer gear 77 is disengaged such that the first transfer gear 77 is free-wheeling on the first layshaft 46. When this ratio for the second gear 86 is provided, power flows from the transmission input shaft 28, through the transmission input gear 36, through the second layshaft input gear 66, through the second input hub 56, through the second clutch 62, through the second layshaft 48, through the second gear 86, through the second output gear 110, through the single intermediate shaft 156, and to the output shaft 30. Like in FIG. 3, one ratio for the third gear 76 is provided where the first clutch 60 is engaged (i.e. closed) and the second clutch 62 is disengaged (i.e. open). The third gear 76 is engaged and rotates with the first layshaft 46, which drives rotation of the third output gear 100. The third output gear 100 is engaged and rotates with the single intermediate shaft 156, which drives rotation of the output shaft 30. The second transfer gear 87 is disengaged such that the second transfer gear 87 is freewheeling on the second layshaft 48. When this ratio for the third gear 76 is provided, power flows from the transmission input shaft 28, through the transmission input gear 36, through the first layshaft input gear 64, through the first input hub 52, through the first clutch 60, through the first layshaft 46, through the third gear 76, through the third output gear 100, through the single intermediate shaft 156, and to the output shaft 30.

An additional ratio for the second gear 86 is provided where the first clutch 60 is disengaged (i.e. open) and the second clutch 62 is engaged (i.e. closed). The second gear 86 is engaged and rotates with the second layshaft 48, which drives rotation of the second output gear 110. The second output gear 110 is disengaged and rotates freely on the single intermediate shaft 156. The first transfer gear 77 is engaged with the first layshaft 46 such that the first transfer gear 77 rotates with and drives the first layshaft 46. Any one of the other gears carried on the first layshaft 46 may be engaged to send torque back to the single intermediate shaft 156, thus creating the additional ratio. By way of example and without limitation, the fifth gear 78 may be engaged with the first layshaft 46 such that the fifth gear 78 is driven by the first layshaft 46, which is driven by the first transfer gear 77. The fifth gear 78 is meshingly engaged with the fifth output gear 102 and therefore drives rotation of the fifth output gear 102. The fifth output gear 102 is engaged with the single intermediate shaft 156, which drives rotation of the output shaft 30. Accordingly, to provide the additional ratio for the second gear 86, power flows from the transmission input shaft 28, through the transmission input gear 36, through the second layshaft input gear 66, through the second input hub 56, through the second clutch 62, through the second layshaft 48, through the second gear 86, through the second output gear 110, through the first transfer gear 77, through the first layshaft 46, through the fifth gear 78, through the fifth output gear 102, through the single intermediate shaft 156, and to the output shaft 30. An additional ratio for the third gear 76 is provided where the first clutch 60 is engaged (i.e. closed) and the second clutch 62 is disengaged (i.e. open). The third gear 76 is engaged and rotates with the first layshaft 46, which drives rotation of the third output gear 100. The third output gear 100 is disengaged and rotates freely on the single intermediate shaft 156. The second transfer gear 87 is engaged such that the second transfer gear 87 rotates with the second layshaft 48. Any one of the other gears carried on the second layshaft 48 may be engaged to send torque back to the single intermediate shaft 156, thus creating the additional ratio. By way of example and without limitation, the sixth gear 90 may be engaged with the second layshaft 48 such that the sixth gear 90 is driven by the second layshaft 48, which is driven by the second transfer gear 87. The sixth gear 90 is meshingly engaged with the sixth output gear 114 and therefore drives rotation of the sixth output gear 114. The sixth output gear 114 is engaged with the single intermediate shaft 156, which drives rotation of the output shaft 30. Accordingly, to provide the additional ratio for the third gear 76, power flows from the transmission input shaft 28, through the transmission input gear 36, through the first layshaft input gear 64, through the first input hub 52, through the first clutch 60, through the first layshaft 46, through the third gear 76, through the third output gear 100, through the second transfer gear 87, through the second layshaft 48, through the sixth gear 90, through the sixth output gear 114, through the single intermediate shaft 156, and to the output shaft 156. Notwithstanding the examples provided above, it should be appreciated that any one of the other gears carried on the first layshaft 46 may be engaged with the first layshaft 46 to be driven by the first transfer gear 77 and redirect torque back to the single intermediate shaft 156 and any one of the other gears carried on the second layshaft 48 may be engaged with the second layshaft 48 to be driven by the second transfer gear 87 and re-direct torque back to the single intermediate shaft 156. Further still, additional transfer gears may be provided to increase the number of possible gear combinations to provide additional ratios.

Figure 8:
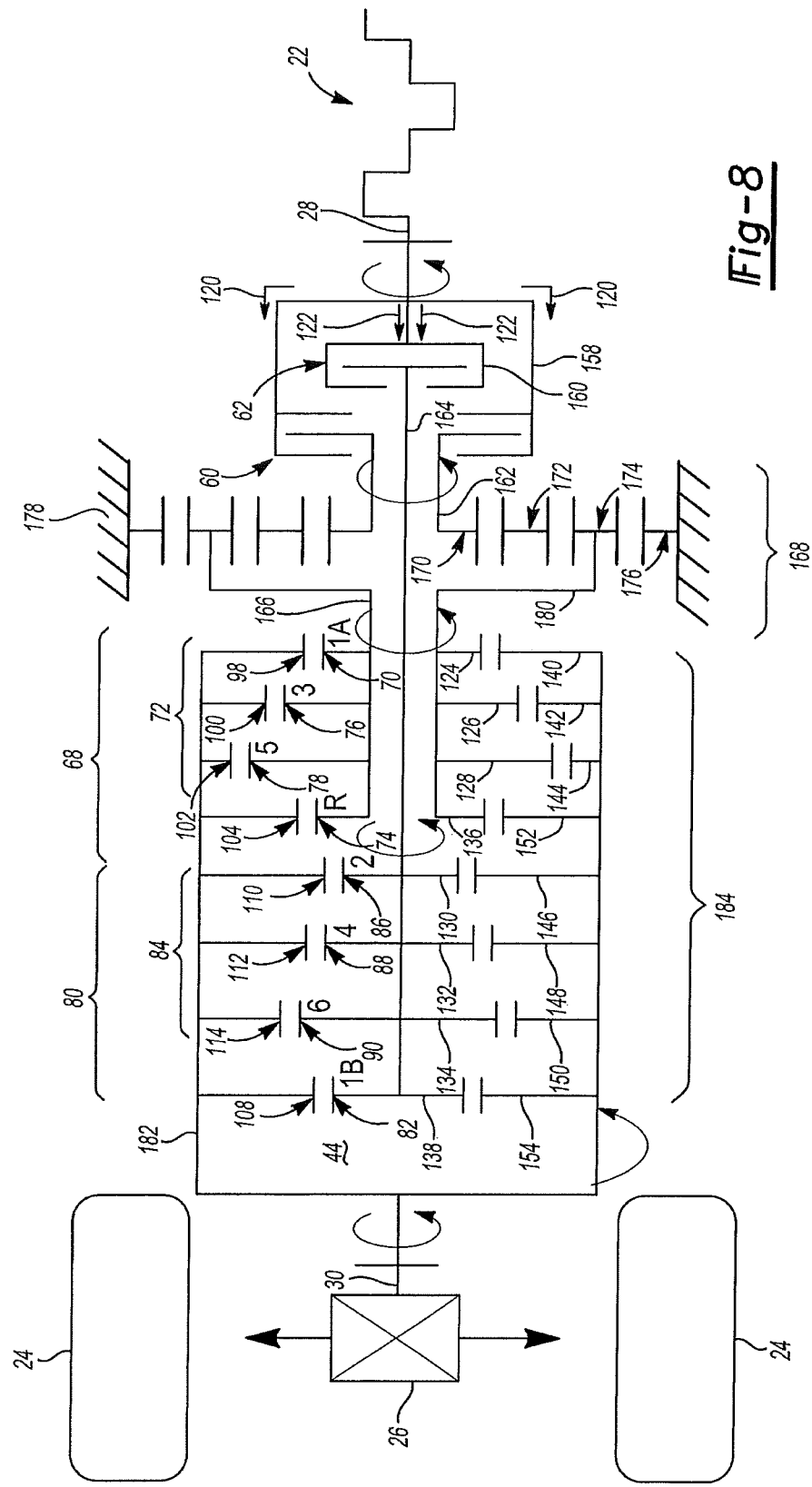
FIG. 8 is a schematic view of another exemplary dual-clutch transmission assembly constructed in accordance with the subject disclosure where the dual-clutch transmission assembly has a planetary configuration with two sets of pinion gears.
Figure 9:
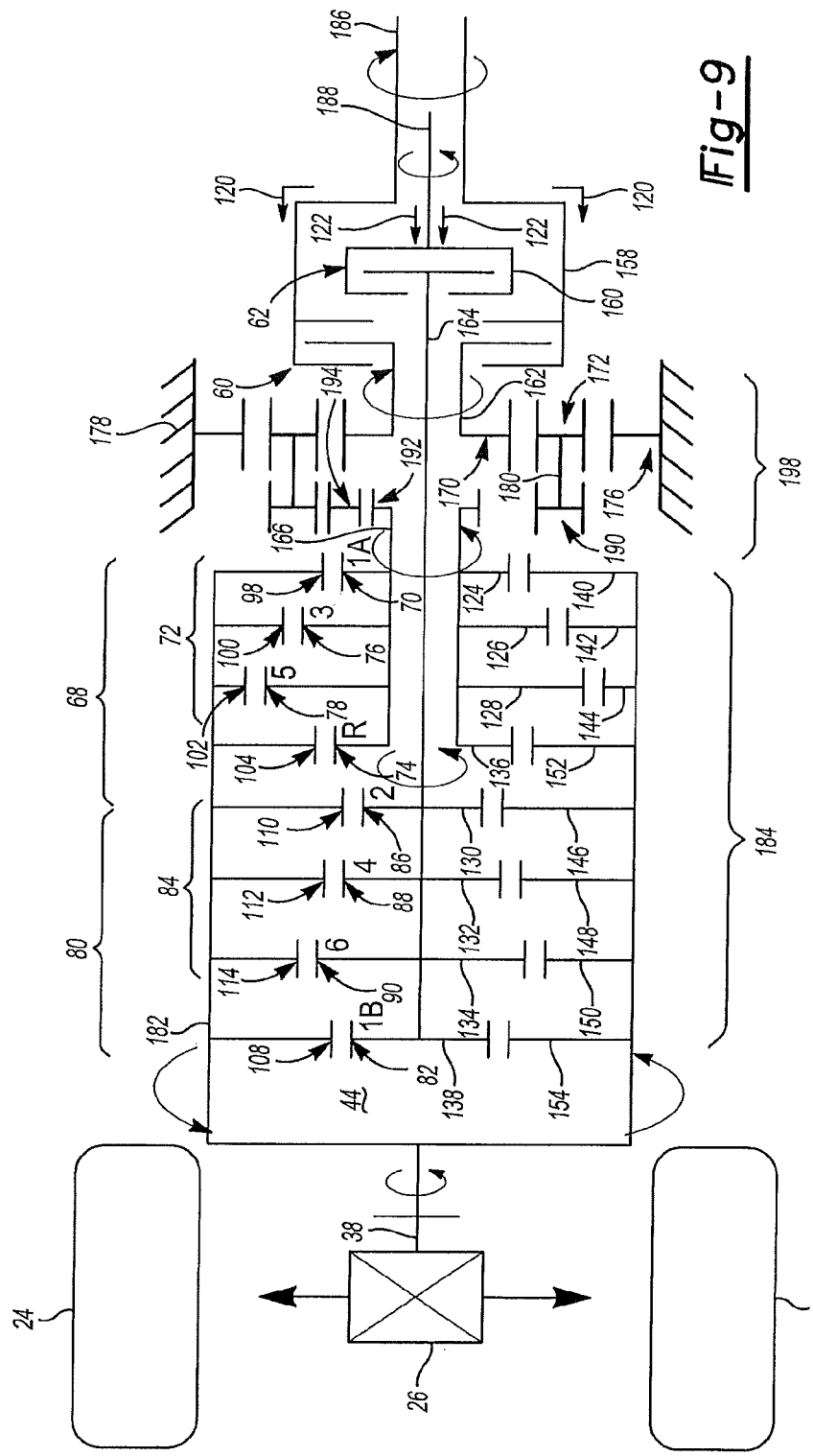
FIG. 9 is a schematic view of another exemplary dual-clutch transmission assembly constructed in accordance with the subject disclosure where the dual-clutch transmission assembly has a planetary configuration with one set of pinion gears.

FIGS. 8 and 9 illustrate a planetary configuration of the disclosed dual-clutch transmission assembly 20. Referring to FIG. 8, the dual-clutch transmission assembly 20 includes at least one transmission input shaft 28 and a transmission output shaft 30 that are spaced from one another by a longitudinal gap 44. Again, the at least one transmission input shaft 28 may be rotatably coupled to an engine 22 and the transmission output shaft 30 may be rotatably coupled to one or more drivetrain components 26 that transfers torque to the wheels 24 of the vehicle. A first input member 158 is rotatably coupled to the at least one transmission input shaft 28. Although the first input member 158 may have a variety of different shapes, the first input member 158 may have the shape of a drum for example. A second input member 160 is disposed co-axially within the first input member 158. The second input member 160 may also be rotatably coupled to the at least one transmission input shaft 28. By way of non-limiting example, the first and second input members 158, 160 may be fixed to the at least one transmission input shaft 28 by a splined, bolted, or welded connection or may be integral with the at least one transmission input shaft 28. The dual-clutch transmission assembly 20 also includes a first shaft 162 that is aligned with the first input member 158. The first shaft 162 is also hollow and receives a second shaft 164 that is disposed co-axially within the first shaft 162. A first clutch 60 is disposed between and interconnects the first input member 158 and the first shaft 162. When engaged, the first clutch 60 couples rotation of the first input member 158 with the first shaft 162. A second clutch 62 is disposed between and interconnects the second input member 160 and the second shaft 164. When engaged, the second clutch 62 couples rotation of the second input member 160 with the second shaft 164.

The dual-clutch transmission assembly 20 further includes a third shaft 166 that is hollow and that extends co-axially about the second shaft 164 at a location that is axially spaced from the first shaft 162. A planetary gearset 168 is disposed between and interconnects the first shaft 162 and the third shaft 166. The planetary gearset 168 includes a sun gear 170, at least one pinion gear 172, 174, and a ring gear 176. The sun gear 170 is rotatably coupled to and is carried on the first shaft 162 and the ring gear 176 is fixed to a ground 178. By way of example and without limitation, the sun gear 170 may be fixed to the first shaft 162 by a splined, bolted, or welded connection or may be integral with the first shaft 162. By way of example and without limitation, the ground 178 may be a housing of the dual-clutch transmission assembly 20.

Still referring to FIG. 8, the at least one pinion gear 172, 174 includes a first set of pinion gears 172 and a second set of pinion gears 174. The first set of pinion gears 172 is disposed in meshing engagement with the sun gear 170. The second set of pinion gears 174 is disposed in meshing engagement with the first set of pinion gears 172. The ring gear 176 is then disposed in meshing engagement with the second set of pinion gears 174. A carrier 180 is disposed between and rotatably couples the second set of pinion gears 174 and the third shaft 166. Therefore rotation of the carrier 180 drives the third shaft 166.

A first gearset 68 is rotatably coupled to and is carried on the third shaft 166 and a second gearset 80 is rotatably coupled to and is carried on the second shaft 164. By way of non-limiting example, the gears of the first gearset 68 and the second gearset 80 may be selectively engaged to (by dog clutches, mechanical diodes, and the like) or fixed with (by splined, bolted, or welded connections and the like) the second and third shafts 164, 166. The axial arrangement of the first gearset 68 and the second gearset 80 is such that the first gearset 68 is disposed axially between the second gearset 80 and the planetary gearset 168. The first gearset 68 includes a plurality of odd numbered gears 72 and a reverse gear 74. In the exemplary configuration shown in FIG. 8, the plurality of odd numbered gears 72 of the first gearset 68 includes a primary first gear 70, a third gear 77, and a fifth gear 78. The second gearset 80 includes a plurality of even numbered gears 84 and a duplicate first gear 82. In the exemplary configuration shown, the plurality of even numbered gears 84 includes a second gear 86, a fourth gear 88, and a sixth gear 90.

An output member 182 extends co-axially about the first gearset 68 and the second gearset 80. Although the output member 182 may have a variety of different shapes, the output member 182 may have the shape of a drum for example. The output member 182 is rotatably coupled to the transmission output shaft 30 such that rotation of the output member 182 drives the transmission output shaft 30. An output gearset 184 is rotatably coupled to and is carried on the output member 182. By way of non-limiting example, the gears of the output gearset 184 may be selectively engaged to the output member 182 by dog clutches, mechanical diodes, and the like or may be fixed to the output member 182 by splined, bolted, or welded connections and the like. The output gearset 184 is also arranged in meshing engagement with the first gearset 68 and the second gearset 80. The output gearset 184 includes: a primary first output gear 98 arranged in meshing engagement with the primary first gear 70 of the first gearset 68, a second output gear 110 arranged in meshing engagement with the second gear 86 of the second gearset 80, a third output gear 100 arranged in meshing engagement with the third gear 76 of the first gearset 68, a fourth output gear 112 arranged in meshing engagement with the fourth gear 88 of the second gearset 80, a fifth output gear 102 arranged in meshing engagement with the fifth gear 78 of the first gearset 68, a sixth output gear 114 arranged in meshing engagement with the sixth gear 90 of the second gearset 80, a duplicate first output gear 108 arranged in meshing engagement with the duplicate first gear 82 of the second gearset 80, and a reverse output gear 104 arranged in meshing engagement with the reverse gear 74 of the first gearset 68. Accordingly, the first and second gearsets 68, 80 transfer rotational energy and torque from the third shaft 166 and the second shaft 164, respectively, to the output gearset 184 and thus the output member 182 during operation of the of the dual-clutch transmission assembly 20 shown in FIG. 8.

As explained in connection with the configuration shown in FIG. 1, the gears of the first gearset 68 have diameters 124, 126, 128, 136 and the gears of the second gearset 80 have diameters 130, 132, 134, 138. Similarly, the gears of the output gearset 184 have diameters 140, 142, 144, 146, 148, 150, 152, 154. The plurality of odd numbered gears 72 of the first gearset 68 shown in FIG. 8 may have gear diameters 124, 126, 128 that increase with each higher numbered gear and the plurality of even numbered gears 84 of the second gearset 80 shown in FIG. 8 may have gear diameters 130, 132, 134 that increase with each high numbered gear. The gears of the output gearset 184 may thus have diameters 140, 142, 144, 146, 148, 150 that decrease with each high numbered output gear. In accordance with the subject disclosure, the primary first gear diameter 124 of the primary first gear 70 is equal to the duplicate first gear diameter 138 of the duplicate first gear 82. It should be appreciated that this dimensional relationship between the primary first gear 70 and the duplicate first gear 82 allows for contemporaneous engagement of the primary first gear 70 and the duplicate first gear 82.

During operation of the dual-clutch transmission assembly 20 shown in FIG. 8, the at least one transmission input shaft 28, the first shaft 162, the second shaft 164, the third shaft 166, the output member 182, and the transmission output shaft 30 all rotate in the same direction. The first gearset 68 and the second gearset 80 receive torque from the third shaft 166 and the second shaft 164, respectively, in response to contemporaneous engagement of the first clutch 60 and the second clutch 62 during launch of the vehicle. Advantageously, this splits the torque that is applied to the first and second clutches 60, 62 and reduces heat generation in the first clutch 60 and in the second clutch 62.

FIG. 9 illustrates an alternative configuration of the dual-clutch transmission assembly 20 where there are two transmission input shafts 186, 188. The first transmission input shaft 186 is rotatably coupled to the first input member 158 and the second transmission input shaft 188 is rotatably coupled to the second input member 160. The first transmission input shaft 186 may be hollow and thus the second transmission input shaft 188 may be co-axially arranged within the first transmission input shaft 186. It should be appreciated that it this configuration, the first transmission input shaft 186 and the second transmission input shaft 188 are capable of rotating in opposite directions. When the first and second clutches 60, 62 are both engaged, the first shaft 162 rotates with the first transmission input shaft 186 and the second shaft 164 rotates with the second transmission input shaft 188, which may be rotating in a direction that is opposite the first shaft 162 and the first transmission input shaft 186.

The first gearset 68, the second gearset 80, the output gearset 184, and the arrangement of the first and second clutches 60, 62, the first, second, and third shafts 162, 164, 166, and the output member 182 of the configuration shown in FIG. 8 are all carried over to the configuration shown in FIG. 9. However, the planetary gearset 168 must be modified to accommodate the opposite rotating directions of the first transmission input shaft 186 and the second transmission input shaft 188.

In this configuration, the ring gear 176 of the planetary gearset 168 is disposed in meshing engagement with the first set of pinion gears 172 and the second set of pinion gears 174 is eliminated. The planetary gearset 168 further includes at least one auxiliary pinion gear 190 that is rotatably coupled to the first set of pinion gears 172 by carrier 180. The planetary gearset 168 also includes an auxiliary sun gear 192 that is rotatably coupled to the third shaft 166. By way of example and without limitation, the auxiliary sun gear 192 may be fixed to the third shaft 166 by a splined, bolted, or welded connection or may be integral with the third shaft 166. A reverse idler 194 is disposed in meshing engagement with both the auxiliary pinion gear 190 and the auxiliary sun gear 192. The reverse idler 194 operates to reverse rotation of the auxiliary sun gear 192 and thus the third shaft 166 relative to the carrier 180. Accordingly, the second shaft 164, the third shaft 166, and the output member 182 all rotate in the same direction when the first shaft 162 and the second shaft 164 are rotating in opposite directions. Because rotation of the third shaft 166 is reversed from rotation of the first shaft 162, the first and second gearsets 68, 80 do not bind with the output gearset 184 when the first and second clutches 60, 62 are simultaneously engaged. This configuration of the planetary gearset 168 thus allows torque to be split between the first and second clutches 60, 62 when the dual-clutch transmission assembly 20 includes two transmission input shafts 186, 188 rotating in opposite directions.

Figure 10:
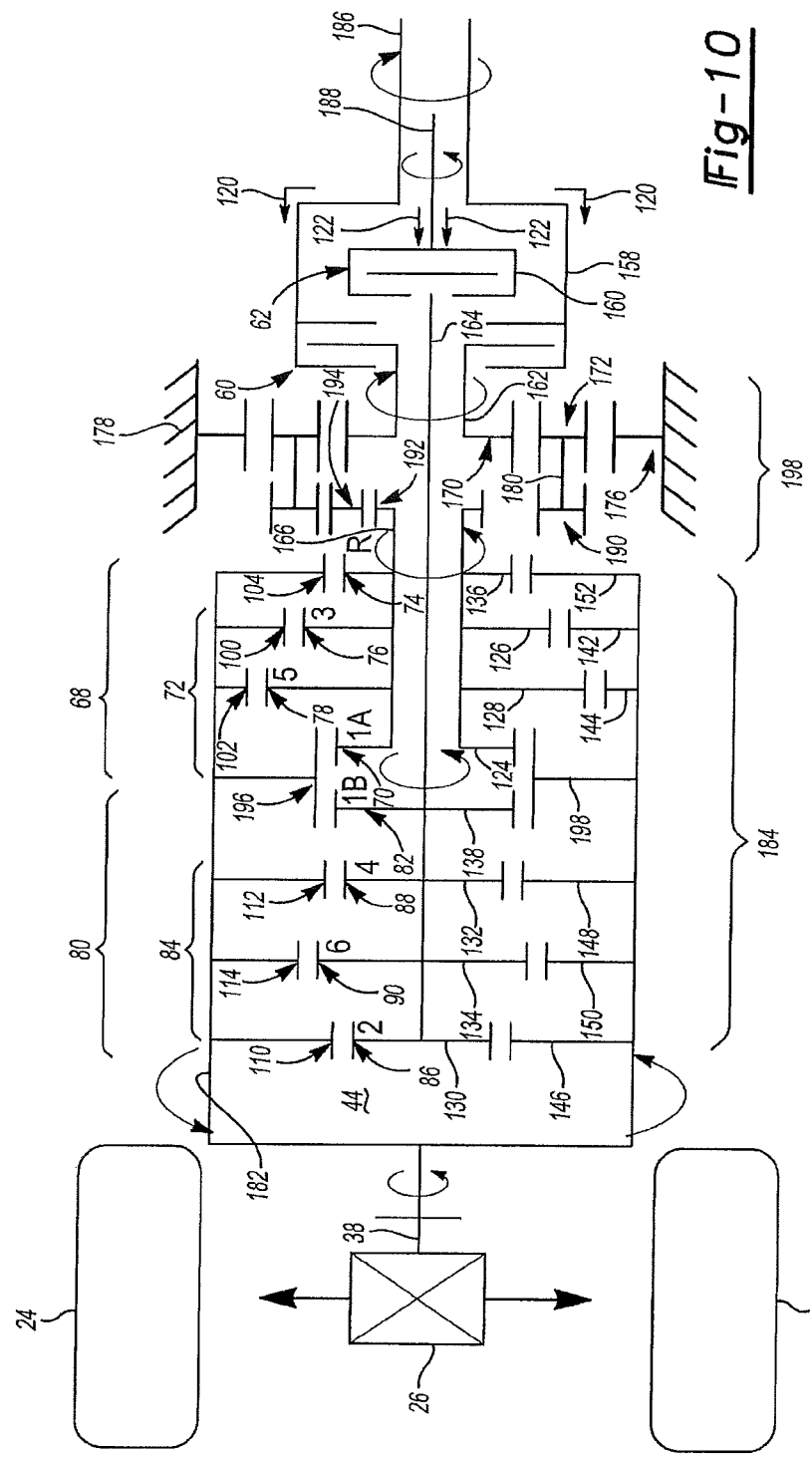
FIG. 10 is a schematic view of another exemplary dual-clutch transmission assembly constructed in accordance with the subject disclosure where the dual-clutch transmission assembly has a planetary configuration with a primary first gear and a duplicate first gear that are meshingly engaged with a common output gear.

In FIG. 10, an alternative planetary configuration of the dual-clutch transmission assembly 20 is illustrated. The arrangement of the primary first gear 70 and the duplicate first gear 82 shown yields a planetary configuration of the dual-clutch transmission assembly 20 that is more compact. Advantageously, the positioning of the duplicate first gear 82 in this configuration allows the duplicate first gear 82 to be added without increasing the overall dimensions (i.e. length, height, and width) of the dual-clutch transmission assembly 20. As a result, transmission housings from other dual-clutch transmission assemblies that do not have a duplicate first gear can be utilized with little to no modification.

In FIG. 10, the positions of the primary first gear 70 on the third shaft 166, the reverse gear 74 on the third shaft 166, the duplicate first gear 82 on the second shaft 164, and the second gear 86 on the second shaft 164 have been modified from those shown in FIGS. 8 and 9. With reference to FIG. 10, the primary first gear 70 and the duplicate first gear 82 are axially positioned adjacent to one another and are both disposed in meshing engagement with a common output gear 196 in a side-by-side spaced relationship. The common output gear 196 has a common output gear diameter 198. The primary first gear 70, the reverse gear 74, the third gear 76, and the fifth gear 78 are carried on the third shaft 166 and rotate with the third shaft 166 if engaged. The reverse gear 74 is axially positioned at one end of the third shaft 166 adjacent to the auxiliary sun gear 192. The primary first gear 70 is axially positioned at an opposite end of the third shaft 166 that is opposite the auxiliary sun gear 166. The duplicate first gear 82, the second gear 86, the forth gear 88, and the sixth gear 90 are carried on the second shaft 164 and rotate with the second shaft 164 if engaged. The duplicate first gear 82 is axially positioned between the primary first gear 70 (which is on the third shaft 166) and the fourth gear 88 (which is on the second shaft 164). The common output gear 196 is carried on and rotates with the output member 182. The common output gear 196 is wide enough that it is disposed in meshing engagement with both the primary first gear 70 and the duplicate first gear 82. Therefore, the primary first gear 70 and the duplicate first gear 82 commonly share the common output gear 196 and both the primary first gear 70 and the duplicate first gear 82 cooperate to drive the common output gear 196 when the first and second clutches 60, 62 are engaged.

During vehicle launch, the primary first gear 70, the duplicate first gear 82, and the first and second clutches 60, 62 are engaged such that the torque applied to the transmission input shaft 28 is split between the first torque flow path 120 and the second torque flow path 122. The first torque flow path 120 passes through the first clutch 60, through the planetary gearset 168, through the primary first gear 70, through the common output gear 196, and to the output member 182. The second torque flow path 122 passes through the second clutch 62, through the duplicate first gear 82, through the common output gear 196, and to the output member 182. Accordingly, the first and second torque flow paths 120, 122 are re-combined at the common output gear 196. In this way, the duplicate first output gear 108 shown in FIGS. 8 and 9 is eliminated for improved packaging, reduced cost, and weight savings.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. It should be appreciated that any of the various gears may be selectively or fixedly coupled to the shaft they are carried on, providing a variety of different combinations where the various gears can be selectively engaged and disengaged as needed to control operation of the dual-clutch transmission assembly 20 and effectuate shifts. All such variations are considered to be within the scope of the subject disclosure. It should also be appreciated that although the dual-clutch transmission assembly 20 recited in the claims may be coupled to an engine 22 when the dual-clutch transmission assembly 20 is installed in a vehicle, the presence or absence of the engine 22 and the vehicle are not intended to be required under the appended claims.

What is claimed is:

1. A method of controlling a dual-clutch transmission assembly of a vehicle, the dual-clutch transmission assembly having a first clutch that is connected to a first shaft carrying a primary first gear and a second clutch that is connect to a second shaft carrying a duplicate first gear, the method comprising the steps of:
providing torque to both the first clutch and the second clutch;
engaging the first and second clutches, the primary first gear, and the duplicate first gear contemporaneously during a vehicle launch to split the torque transmitted through the first and second clutches evenly between first and second torque flow paths, the first torque flow path passing through the first clutch, the first shaft, and the primary first gear, the second torque flow path passing through the second clutch, the second shaft, and the duplicate first gear;
transferring the torque from both the first and second torque flow paths to a final drive assembly of the vehicle;
disengaging the first clutch, the primary first gear, and the duplicate first gear after the vehicle launch while the second clutch remains engaged; and
engaging a second gear carried on the second shaft to shift the dual-clutch transmission to a second forward gear ratio after the vehicle launch and create a third torque flow path passing through the second clutch, the second shaft, and the second gear.

2. The method as set forth in claim 1 further comprising the steps of:
engaging a transfer clutch while the second clutch and the second gear remain engaged to transfer the torque from the second shaft to the first shaft of the dual-clutch transmission; and
engaging a third gear carried on the first shaft to provide an additional forward gear ratio using a combination of the second and third gears and create a fourth torque flow path passing through the second clutch, the second shaft, the second gear, the transfer clutch, the first shaft, and the third gear.

3. The method as set forth in claim 1 further comprising the steps of:
disengaging the second clutch and the second gear; and
engaging the first clutch and a third gear carried on the first shaft to shift the dual-clutch transmission to a third forward gear ratio after the vehicle launch and create a fifth torque flow path passing through the first clutch, the first shaft, and the third gear.

4. The method as set forth in claim 3 further comprising the steps of:
engaging a transfer clutch while the first clutch and the third gear remain engaged to transfer the torque from the first shaft to the second shaft of the dual-clutch transmission; and
engaging a fourth gear carried on the second shaft to provide an additional forward gear ratio using a combination of the third and fourth gears and create a sixth torque flow path passing through the first clutch, the first shaft, the third gear, the transfer clutch, the second shaft, and the fourth gear.

5. The method as set forth in claim 1 wherein the second gear rotates with the second shaft when the second gear is engaged and the second gear rotates freely relative to the second shaft when the second gear is disengaged.

6. The method as set forth in claim 1 wherein the primary first gear rotates with the first shaft when the primary first gear is engaged and the primary first gear rotates freely relative to the first shaft when the primary first gear is disengaged.

7. The method as set forth in claim 1 wherein the duplicate first gear rotates with the second shaft when the duplicate first gear is engaged and the duplicate first gear rotates freely relative to the second shaft when the duplicate first gear is disengaged.

8. The method as set forth in claim 1 wherein the primary first gear and the duplicate first gear have equal gear diameters.

* * * * *